US009852351B2

(12) United States Patent
Aguilera Perez et al.

(10) Patent No.: US 9,852,351 B2
(45) Date of Patent: Dec. 26, 2017

(54) 3D ROTATIONAL PRESENTATION GENERATED FROM 2D STATIC IMAGES

(71) Applicant: 3Ditize SL, San Sebastian (ES)

(72) Inventors: Jaime Aguilera Perez, Alcobendas (ES); Fernando Alonso Blazquez, Zumarraga (ES); Juan Bautista Gómez Fernandez, Barcelona (ES)

(73) Assignee: 3Ditize SL, San Sebastian (ES)

( * ) Notice: Subject to any disclaimer, the term of this patent is extended or adjusted under 35 U.S.C. 154(b) by 270 days.

(21) Appl. No.: 14/963,763

(22) Filed: Dec. 9, 2015

(65) Prior Publication Data

US 2016/0171335 A1    Jun. 16, 2016

Related U.S. Application Data

(60) Provisional application No. 62/092,512, filed on Dec. 16, 2014.

(51) Int. Cl.
*G06T 19/00* (2011.01)
*G06T 15/20* (2011.01)
(Continued)

(52) U.S. Cl.
CPC .............. *G06K 9/36* (2013.01); *G06T 15/205* (2013.01); *G06T 19/003* (2013.01);
(Continued)

(58) Field of Classification Search
None
See application file for complete search history.

(56) References Cited

U.S. PATENT DOCUMENTS 7,583,275 B2    9/2009    Neumann et al.
8,254,667 B2    8/2012    Kim et al.
(Continued)

FOREIGN PATENT DOCUMENTS

JP          11-73522          3/1999
JP       2002-024861         1/2002
(Continued)

OTHER PUBLICATIONS

Henrichsen, Arne, "3D Reconstruction and Camera Calibration from 2D Images", University of Cape Town, Dec. 2000, pp. 1-109.
(Continued)

*Primary Examiner* — Bernard Krasnic
(74) *Attorney, Agent, or Firm* — Raubvogel Law Office

(57) ABSTRACT

A computer-implemented method may be used to generate a 3D interactive presentation, referred to as a rotograph, illustrating a main object from a rotating viewpoint. A plurality of two-dimensional images may be received. A three-dimensional scene may be generated, with a virtual camera and an axis of rotation. Each of the two-dimensional images may be positioned in the three dimensional scene such that the plurality of two-dimensional images are oriented at different orientations about the axis of rotation. A motion pathway may be defined within the three-dimensional scene, by which the virtual camera is rotatable about the axis of rotation to view the plurality of two-dimensional images in sequence. A plurality of rotograph images may be captured with the virtual camera during motion of the virtual camera along the motion pathway to generate the rotograph, which may be displayed on a display screen.

23 Claims, 16 Drawing Sheets

(51) Int. Cl.
   *G06K 9/36*   (2006.01)
   *H04N 13/02*  (2006.01)

(52) U.S. Cl.
   CPC ....... *H04N 13/026* (2013.01); *H04N 13/0207* (2013.01); *H04N 13/0221* (2013.01)

(56) References Cited

U.S. PATENT DOCUMENTS

| | | | |
|---|---|---|---|
| 8,369,610 | B1 | 2/2013 | Korobkin |
| 8,705,892 | B2 | 4/2014 | Aguilera et al. |
| 9,122,368 | B2 | 9/2015 | Szeliski et al. |
| 2003/0137506 | A1* | 7/2003 | Efran ............... G06T 9/00 345/419 |
| 2004/0104935 | A1 | 6/2004 | Williamson et al. |
| 2005/0083248 | A1 | 4/2005 | Biocca et al. |
| 2006/0066612 | A1 | 3/2006 | Yang et al. |
| 2006/0132482 | A1 | 6/2006 | Oh |
| 2008/0033641 | A1 | 2/2008 | Medalia |
| 2009/0128577 | A1 | 5/2009 | Gloudemans et al. |
| 2010/0110069 | A1 | 5/2010 | Yuan |
| 2010/0208033 | A1 | 8/2010 | Edge et al. |
| 2010/0315412 | A1 | 12/2010 | Sinha et al. |
| 2011/0273451 | A1 | 11/2011 | Salemann |
| 2012/0050525 | A1 | 3/2012 | Rinner et al. |
| 2012/0099804 | A1 | 4/2012 | Perez et al. |
| 2012/0179983 | A1* | 7/2012 | Lemire ............ G06F 17/30905 715/757 |
| 2013/0050184 | A1* | 2/2013 | Song ............... G02B 27/2285 345/419 |
| 2013/0222385 | A1* | 8/2013 | Dorsey ............ G06T 11/20 345/427 |
| 2013/0249792 | A1 | 9/2013 | Carraro et al. |
| 2013/0254666 | A1 | 9/2013 | Snavely et al. |
| 2014/0132594 | A1 | 5/2014 | Gharpure et al. |
| 2014/0198178 | A1 | 7/2014 | Ioffe et al. |
| 2015/0062125 | A1* | 3/2015 | Aguilera Perez ..... G06T 19/003 345/427 |
| 2015/0212688 | A1* | 7/2015 | Mcmillan ........... G06F 3/04815 715/850 |
| 2015/0358613 | A1 | 12/2015 | Sandrew et al. |

FOREIGN PATENT DOCUMENTS

| | | |
|---|---|---|
| JP | 2002-140731 | 5/2002 |
| JP | 2006-048278 | 2/2006 |
| JP | 2009-015583 | 1/2009 |
| WO | 03049455 | 6/2003 |
| WO | 2009117709 | 9/2009 |

OTHER PUBLICATIONS

Cipolla, R., et al., "Camera Calibration From Vanishing Points in Images of Architectural Scenes", University of Cambridge, Cambridge, UK, 1999, pp. 382-391.

Fangi, Gabriele, et al., "Photointerpretation and Small Scale Stereoplotting With Digitally Rectified Photographs With Geometrical Constraints", University of Ancona, Ancona, Italy, 2001, pp. 1-8.

Guillou, E., et al., "Using Vanishing Points for Camera Calibration and Coarse 3D Reconstruction from a Single Image", The Visual Computer, vol. 16, No. 7, 2000, pp. 396-410.

Chen, Shenchang Eric, "QuickTime VR—An Image-Based Approach to Virtual Environment Navigation", SIGGRAPH 95 Proceedings of the 22nd Annual Conference on Computer Graphics and Interactive Techniques, 1995, pp. 29-38.

Geng, Weidong et al., "Picture-Based Virtual Touring", The International Journal of Virtual Reality, vol. 4, No. 3, 2000, pp. 1-13.

Zhang, Qiushuang et al., "An Efficient Image-Based Virtual Tour System", Multi-Agent Security and Survivability, 2004 IEEE First Symposium, pp. 511-514, Dec. 2004.

Uyttendaele, M., et al., "Image-Based Interactive Exploration of Real-World Environments", Computer Graphics and Applications, IEEE, vol. 24, No. 3, pp. 52-63, May-Jun. 2004.

Liu, Yixian et al., "Stage-Based 3D Scene Reconstruction from Single Image", 21st International Conference on Pattern Recognition, Nov. 11, 2012, pp. 1034-1037.

Nedovic, Vladimir, et al., "Depth Information by Stage Classification", Computer Vision 2007, IEEE 11th International Conference, Oct. 1, 2007, pp. 1-8.

Lee, D.C., "Geometric Reasoning for Single Image Structure Recovery", 2009 IEEE Conference on Computer Vision and Pattern Recognition; Jun. 20-25, 2009, pp. 2136-2143.

Iizuka, Satoshi, et al., "Efficiently Modeling 3D Scenes from a Single Image", IEEE Computer Graphics and Applications, IEEE Service Center, New York, NY, vol. 32, No. 1, Nov. 1, 2012, pp. 18-25.

Wang, Zhenyu, et al., "Depth Template Based 2D-to-3D Video Conversion and Coding System", 2012 IEEE International Conference on Multimedia and Expo, Jul. 9, 2012, pp. 308-313.

Barinova, Olga, et al., "Fast Automatic Single-View 3-d Reconstruction of Urban Scenes", Computer Vision ECCV 2008, Oct. 12, 2008, pp. 100-113.

Shesh, Amit, et al., "Peek-in-the-Pic: Flying Through Architectural Scenes from a Single Image", Computer Graphics Forum, vol. 27, No. 8, Dec. 1, 2008, pp. 2143-2153.

Kang, H.W., et al., "Tour Into the Picture using a Vanishing Line and its Extension to Panoramic Images", Eurographics, Cambridge, GB, vol. 20, No. 3, Jan. 1, 2001, pp. 1-11.

Wilczkowiak, Marta, et al., "Using Geometric Constraints through Parallelepipeds for Calibration and 3D Modeling", IEEE Transactions on Pattern Analysis and Machine Intelligence, vol. 27, No. 2, Feb. 1, 2005, pp. 194-207.

Horry, Y., et al., "Tour Into the Picture: Using a Spidery Mesh Interface to Make Animation from a Single Image", SIGGRAPH Computer Graphics Proceedings, Aug. 3, 1997, pp. 225-232.

Hoiem, D., et al., "Automatic Photo Pop-up", ACM Transactions on Graphics, vol. 24, No. 3, Jul. 1, 2005, pp. 577-584.

Ozaki, Nobuyuki, et al., "Development of a system that creates natural scene as a virtual world", The Virtual Reality Society of Japan Collected Papers, vol. 2, No. 2, Japan, Jun. 1997, pp. 1-8.

* cited by examiner

3D ROTATIONAL PRESENTATION GENERATED FROM 2D STATIC IMAGES

CROSS-REFERENCE TO RELATED APPLICATIONS

The present application claims priority from U.S. Provisional Application Ser. No. 62/092,512 for "3D Rotational Experience Around an Object Generated from 2D Static Images," filed Dec. 16, 2014, which is incorporated herein by reference.

The present application is related to U.S. Utility application Ser. No. 13/226,695 for "Generating Three-Dimensional Virtual Tours from Two-Dimensional Images," filed Sep. 7, 2011 and issued on Apr. 22, 2014 as U.S. Pat. No. 8,705,892, which is incorporated herein by reference.

TECHNICAL FIELD

The present disclosure relates to generation and display of a 3D rotational presentation around an object, generated from a series of 2D static images that have been taken around that object.

BACKGROUND

A 360° view of an object provides a mechanism for a user to inspect an object from different angles as though the object were rotating around a fixed axis. Such views are often presented as a collection of photographs displayed as a video. In some cases, the user can control the speed of the video.

Such 360° views of objects are useful in many different contexts where it may be advantageous for a user to see physical objects from different angles. These views are often provided over the World Wide Web, via a website. Such web-based 360° views of objects may be presented via any suitable format, such as for example Adobe Flash or Javascript.

360° views of objects are often created with special equipment and settings, where the object is placed on a rotary platform that is connected to the shutter of a camera. As the platform rotates, the camera takes a picture. The frequency with which images are captured is usually dependent on the angular speed of the platform. In some cases, special lighting is needed to eliminate dark areas; also, the background is often made white so that the object is completely isolated from the environment.

However, even with a complete set of digital photographs covering a full rotation around an object, most existing technologies are unable to provide a full immersive 3D experience because of two main reasons: the need to have the object isolated from the background and the level of interactivity desired.

Furthermore, existing techniques for providing 360° views of objects generally consume large amounts of bandwidth, since significant amounts of data must be transmitted in order to provide a satisfactory user experience. The user experience relies on the number of frames generated; often, in order to provide a sufficiently high frame rate, the output must be a file with a huge size.

Furthermore, it is often difficult to make changes to a 360° view of an object, since changing one aspect or portion generally requires re-shooting the entire object again.

Furthermore, many existing techniques for providing a 360° view of an object introduce discontinuities when transitioning from one image to the next, which can detrimentally affect the immersive quality of the 360° view.

SUMMARY

Various embodiments of the technology described herein provide a novel concept, referred to herein as rotography, for generating and displaying a 3D interactive rotational presentation, referred to as a rotograph, from 2D images taken of an object, around that object. Two or more 2D images taken, for example, around an axis of rotation, are combined to form a 3D scene. The 3D scene may be used to define the relationship(s) among pairs of 2D images in a 3D space. The 2D images may be obtained in various ways and may be of any type. In some embodiments, the 2D images may be captured by a digital camera operated by the user; alternatively they may be received over a network or retrieved from a storage device.

Arcs may be defined to connect the 2D images with one another according to defined spatial relationships. The arcs may be used to guide virtual camera motion from one image to the next. The arcs may allow a radial movement around the axis of the 3D scene with a maximum radius equivalent to the one at which the virtual camera may have a field-of-view bounded by the 2D image plane. In at least one embodiment, the virtual camera moves along the arc, creating a 3D rotational experience from the point of view of the virtual camera.

In various embodiments, different mechanisms can be provided for rotating around the 3D scene. The user can be given an opportunity to control the rotation speed, zoom level, and/or other parameters of the virtual camera or the 2D images. In other embodiments, the rotation can take place automatically without requiring user interaction.

According to various embodiments, the system and method provide several advantages over prior techniques for providing 360° views of objects. For example, in one embodiment, the system and method allow a user to rotate around an object in an immersive way because there is no appearance of discontinuity between 2D images.

In addition, in at least one embodiment, the system and method allow a rotograph to be generated from 2D images taken with ordinary digital cameras, without the need for taking a 360° image that may require special equipment to generate.

According to various embodiments, the system and method can be used to generate rotographs for many different applications. Examples include: people, selfies, places, rooms, furniture, statues, dishes, vehicles, mechanical parts, etc.

BRIEF DESCRIPTION OF THE IMAGES

The accompanying drawings illustrate several embodiments. Together with the description, they serve to explain the principles of the embodiments. One skilled in the art will recognize that the particular embodiments illustrated in the drawings are merely exemplary, and are not intended to limit scope.

Figure 14:
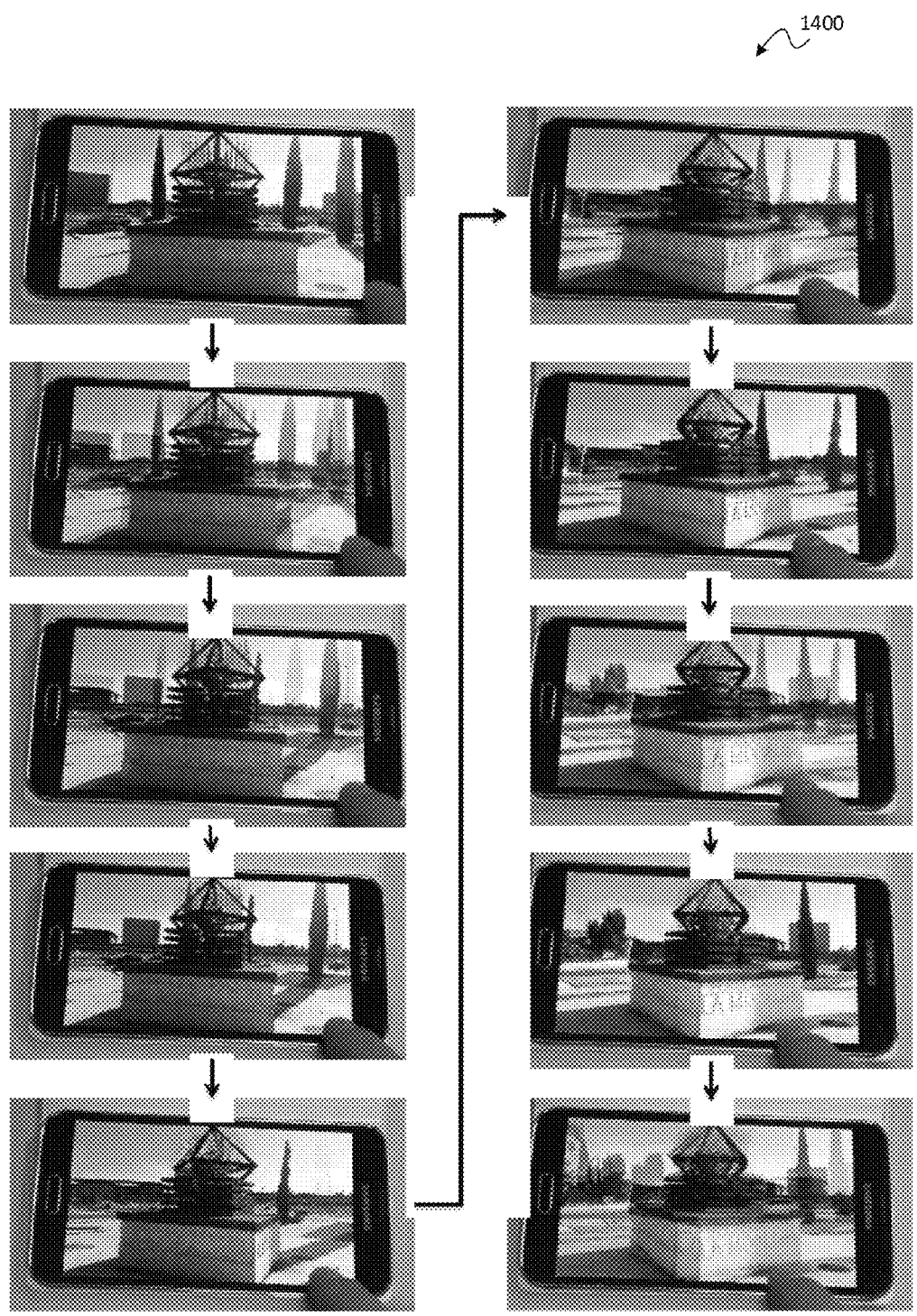

FIG. 14 a set of screenshot diagrams illustrating the display of a rotograph of an architectural object, according to another embodiment.

Figure 15:

FIG. 15 is a set of screenshot diagrams illustrating the display of a rotograph of a person, according to one embodiment.

DETAILED DESCRIPTION

According to various embodiments, a three-dimensional (3D) rotating experience ("rotograph") is generated from a series of two-dimensional (2D) images. Throughout the following description, the terms "image," "photo," "photograph," and "photographic image" may be used; however, one skilled in the art will recognize that the techniques described herein can be implemented using any still images and is not limited to photographs. Thus, references to "image," "photo," "photograph," and "photographic image" should be considered to include any still images, pictures, photographs, sketches, and the like.

In the description provided herein, the following terms are used:

A 2D image or two-dimensional image is any image, such as a photograph, that is encoded in a digital image file.

A main object is the object or element that the user is to rotate around in the rotograph, for instance a person, statue, etc. and is usually (but not always) in the center of the 2D images.

A main axis is a virtual axis that passes through the main object to define a vertical direction, an axis of symmetry, and/or the like, relative to the main object.

A 3D scene or three-dimensional scene is a construct that defines positions and relationships, in 3D space, among two or more 2D images.

An axis of rotation is a virtual axis defined in the 3D scene, about which the user's viewpoint is to rotate to generate the rotograph.

A virtual camera is a viewpoint within a 3D scene that is defined in terms of a focal length, position and orientation within the 3D scene. A 3D view for the user may be generated based on the position and orientation of the virtual camera.

An arc is a defined path that is traversed by the virtual camera when moving from a view of one 2D image to a view of another 2D image.

A rotograph, or 3D interactive rotational experience or 3D rotational experience, is a traversal around the 3D scene, which traversal may be user-controlled or automated.

A closed rotograph, or closed-loop rotograph, is a rotograph that has no start or end.

An open rotograph, or open-loop rotograph, is a rotograph that has a start and end.

In one embodiment, a plurality of 2D images is captured from viewpoints that rotate around a main object. Each of the 2D images is analyzed to (1) identify the main object, and (2) identify the main axis of the object. A 3D scene is defined with an axis of rotation about which a virtual camera is to rotate. Each of the 2D images is positioned in the 3D scene, with the main axis of each 2D image aligned with the axis of rotation. An angular displacement between 2D images is specified. The 2D images are connected together with arcs that define a pathway for the virtual camera. Then, the virtual camera moves along the pathway, either autonomously or under user control. The animated viewpoint from the virtual camera generates the rotograph to be viewed by the user.

System Architecture

According to various embodiments, the system can be implemented on any electronic device equipped to capture, receive, store, and/or present information such as images. Such an electronic device may be, for example, a camera, desktop computer, laptop computer, smartphone, tablet computer, or the like.

Although the system is described herein in connection with an implementation in a smartphone, one skilled in the art will recognize that the techniques described herein can be implemented in other contexts, and indeed in any suitable device capable of receiving and/or processing user input. Accordingly, the following description is intended to illustrate various embodiments by way of example, rather than to limit scope.

Figure 1A:
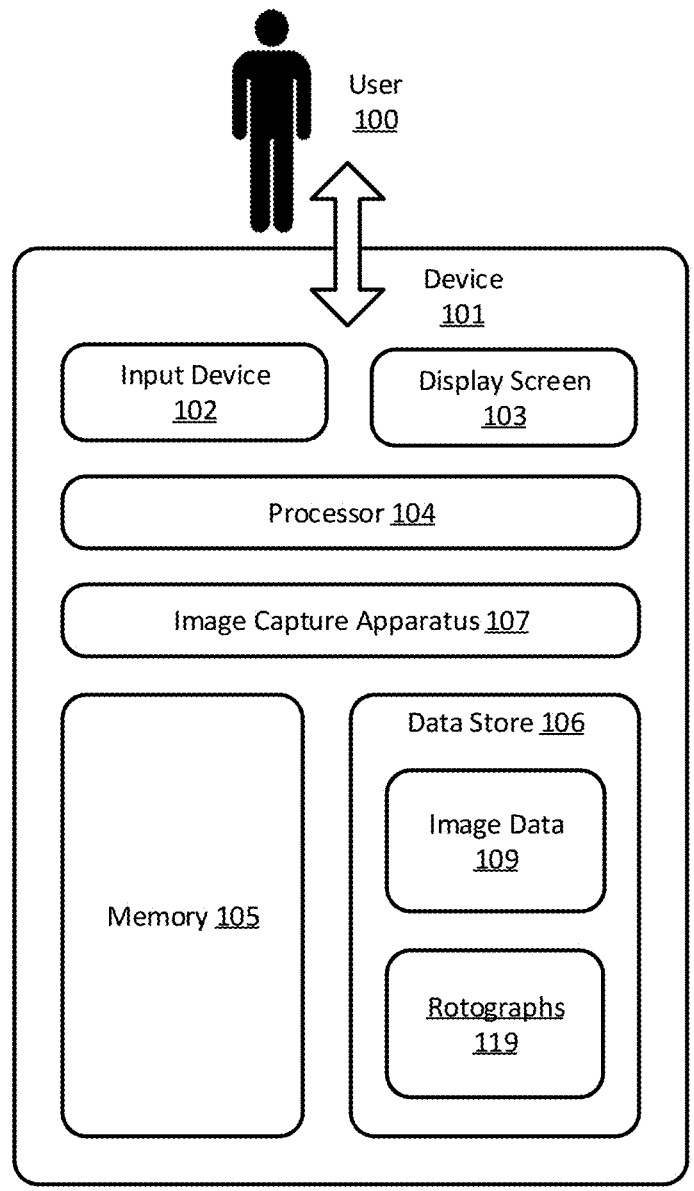
FIG. 1A is a block diagram depicting a hardware architecture according to one embodiment.

Referring now to FIG. 1A, there is shown a block diagram depicting a hardware architecture for practicing the described system, according to one embodiment. Such an architecture can be used, for example, for implementing the described techniques in a smartphone, camera, or other device 101. Device 101 may be any electronic device equipped to receive, store, and/or present information, and to receive user input in connection with such information.

In at least one embodiment, device 101 has a number of hardware components well-known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Data store 106 can be any magnetic, optical, or electronic storage device for data in digital form; examples include flash memory, magnetic hard drive, CD-ROM, DVD-ROM, or the like. In at least one embodiment, data store 106 stores information which may be stored in any known storage schema, including databases, file systems, and the like. In another embodiment, data can be stored elsewhere, and retrieved by device 101 when needed for presentation to user 100. Data store 106 may include one or more data sets, which may be used for a variety of purposes and may include a wide variety of files, metadata, and/or other data. In at least one embodiment, data store 106 may store image data 109, one or more rotographs 119, and/or other data (not shown).

Display screen 103 can be any element that graphically displays information such as image data 109, rotographs 119, items from data store 106, and/or the like. Such output may include, for example, 2D images, 3D scenes, rotographs, and/or related user interface elements. In at least one embodiment where only some of the desired output is presented at a time, a dynamic control, such as a scrolling mechanism, may be available via input device 102 to change which output is currently displayed, and/or to alter the manner in which the output is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary.

In at least one embodiment, data store 106 is detachable in the form of a CD-ROM, DVD, flash drive, USB hard drive, or the like. Data in database 111 can be provided from a source outside of device 101 into a data store 106 that is detachable, and later displayed after the data store 106 is connected to device 101. In another embodiment, data store 106 is fixed within device 101.

Image capture apparatus 107 may be designed to capture a 2D image of a scene proximate the device 101. Thus, the image capture apparatus 107 may be a digital camera or the like. The image capture apparatus 107 may include a CCD, CMOS, or any other sensor that receives light and, based on the light received, generates data. The image capture apparatus 107 may thus be used to capture the image data 109, which may be stored in the data store 106 as set forth previously. In addition to or in the alternative to capturing the image data 109 at the device 101, one or more other devices, such as different computing devices, digital cameras, and/or the like may be used to capture the image data 109, which may then be transferred to the device 101. Alternatively or additionally, image data 109 may be retrieved by the device 101 from a storage device, which may optionally be separate from the data store 106.

Figure 1B:
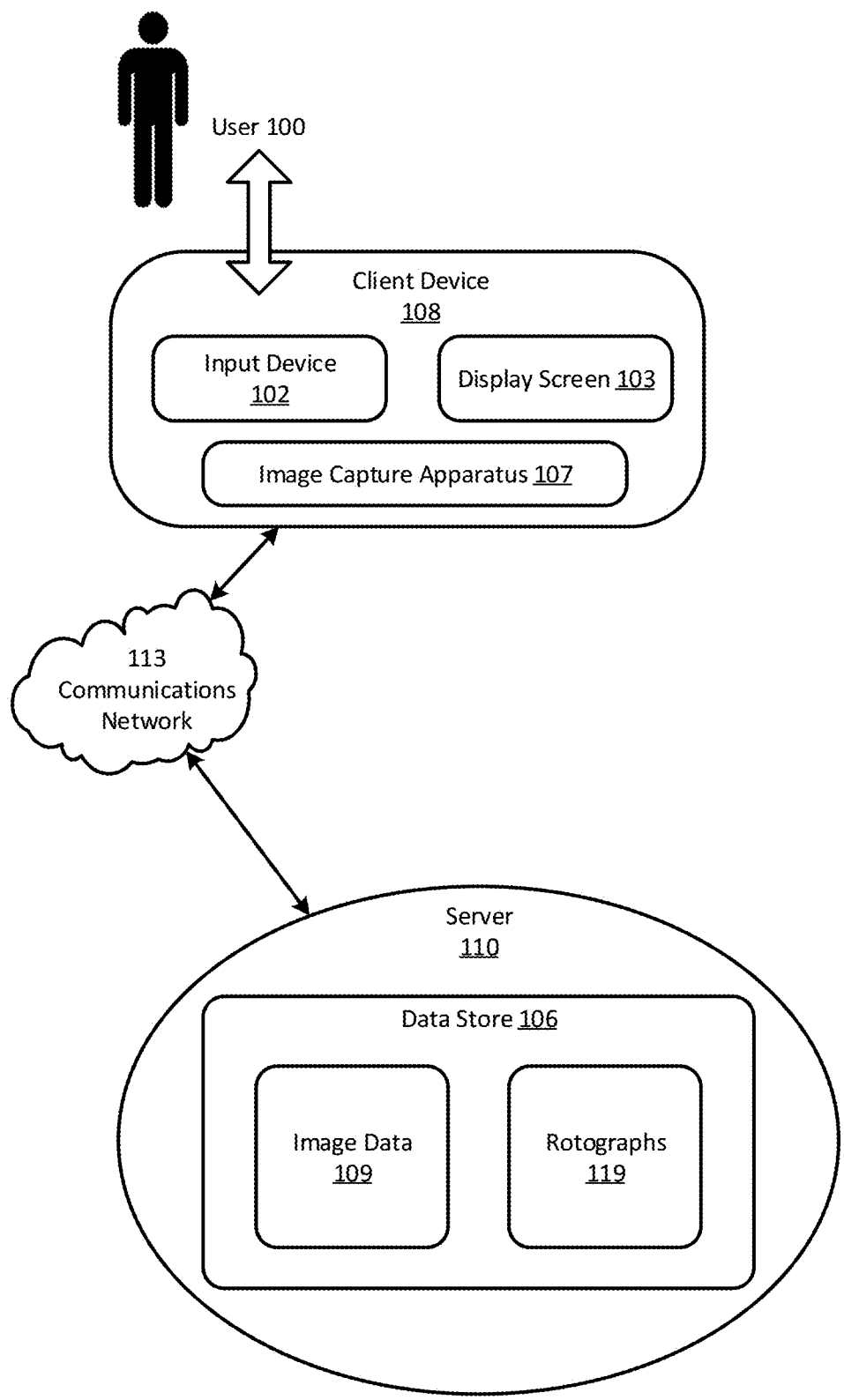
FIG. 1B is a block diagram depicting a hardware architecture in a client/server environment, according to one embodiment.

Referring now to FIG. 1B, there is shown a block diagram depicting a hardware architecture for a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from the data store 106, such as images 109 and rotographs 119, and/or other data derived from the data store 106, can be presented as part of such web pages and/or other web-based resources, using known protocols and languages such as Hypertext Markup Language (HTML), Java, JavaScript, and the like.

Client device 108 can be any electronic device incorporating the input device 102, display screen 103, and/or image capture apparatus 107, such as a desktop computer, laptop computer, personal digital assistant (PDA), cellular telephone, smartphone, music player, handheld computer, tablet computer, kiosk, game system, or the like. Any suitable type of wired and/or wireless communications network 113, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 113, and receives responses from server 110 containing the requested data, including, for example, images 109 and rotographs 119.

In this implementation, server 110 is responsible for data storage and processing, and incorporates data store 106 for storing data, such as the image data 109, one or more rotographs 119, and/or other data (not shown). Server 110 may include additional components as needed for retrieving data (such as images 109 and rotographs 119) from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100.

Some of image data 109, such as 2D images, may be captured and provided by image capture apparatus 107. In at least one embodiment, input device 102 is configured to receive data entries from user 100, to be added to data store 106. Such data entries may include parameters for one or more rotographs 119 to be generated, image capture parameters indicative of how and/or where the images were captured, which may be incorporated into the image data 109 to facilitate rotograph generation, and the like. User 100 may provide such data entries via the hardware and software components described above according to means that are well known to those skilled in the art. According to some embodiments, the user 100 may use the input device 102 to enter image data 109 and/or make selections to control generation of the rotograph from the 2D images.

The server 110 may be connected to several client devices 108 that are used by various individuals of an enterprise, government entity, school, web-accessible subscription service, or other organization, and may thus store image data 109 and/or rotographs 119 from multiple users and/or multiple client devices 108.

Display screen 103 can be any element that graphically displays information such as image data 109, rotographs 119, items from data store 106, and/or the like. Such output may include, for example, 2D images, 3D scenes, rotographs, and/or related user interface elements. In at least one embodiment where only some of the desired output is presented at a time, a dynamic control, such as a scrolling mechanism, may be available via input device 102 to change which output is currently displayed, and/or to alter the manner in which the output is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Image capture apparatus 107 may optionally be a digital camera, as set forth in the description of FIG. 1A. Image data 109 provided by the image capture apparatus 107 may be stored at a location remote from the device 101, such as in the server 110. Additionally or alternatively, in some embodiments, multiple computing devices may be used to generate a rotograph 119 from a set of 2D images. For example, a client device 108 (such as a smartphone or digital camera) may be used to capture the image data 109, which may then be uploaded to a different device (such as a computer), which may generate the rotograph.

In one embodiment, the system can be implemented as software written in any suitable computer programming language, whether in a standalone or client/server architecture. Alternatively, it may be implemented and/or embedded in hardware.

Data Structures

In general, the data stored within the data store 106 of FIG. 1A or FIG. 1B may include image data 109 and/or rotographs 119, which may be encoded using any suitable format.

Figure 2:
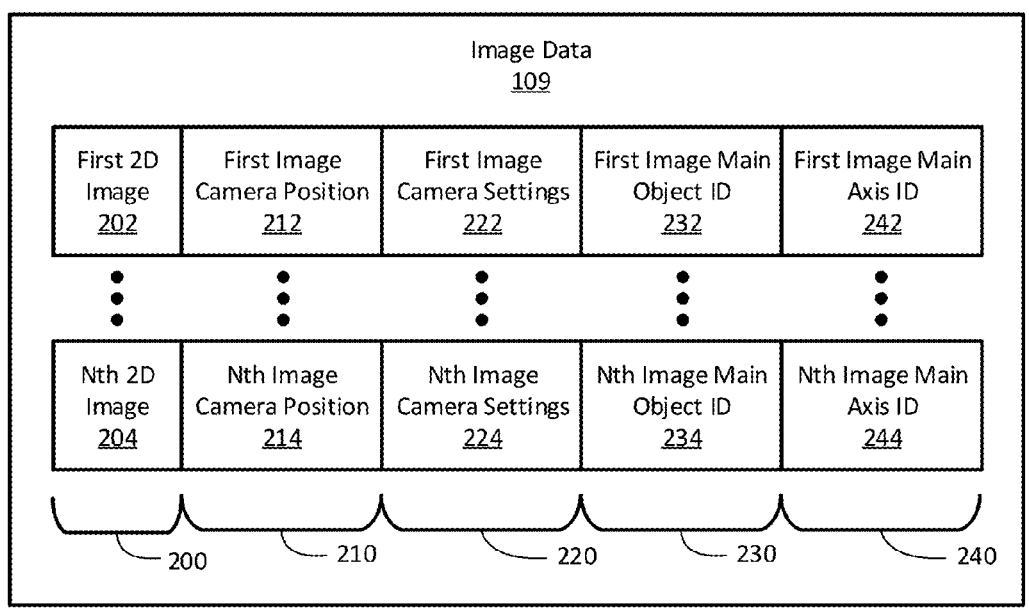
FIG. 2 is a block diagram depicting image data that may be stored and/or used to generate one or more rotographs, according to one embodiment.

Referring to FIG. 2, a block diagram illustrates the image data 109 in greater detail. The image data 109 may include a plurality of 2D images 200. The 2D images 200 may be captured by device 101 and/or client device 108, for example, through the use of image capture apparatus 107. Alternatively, the 2D images 200 may be received from another source and stored in the data store 106. The 2D images 200 may include, for example, a first 2D image 202 and one or more additional 2D images, up to an nth 2D image 204.

In addition to the 2D images 200, the image data 109 may optionally include camera positions 210, camera settings 220, main object ID's 230, and/or main axis ID's 240, each of which may correspond to one of the 2D images 200. Thus, the image data 109 may optionally include a first camera position 212, first camera settings 222, first main object ID 232, and/or a first main axis ID 242, each of which corresponds to the first 2D image 202. Similarly, the image data 109 may optionally include an nth camera position 214, nth camera settings 224, nth main object ID 234, and/or an nth main axis ID 244, each of which corresponds to the nth 2D image 204.

The camera positions 210 may include data indicating the location and/or orientation of the camera (for example, the image capture apparatus 107) when the corresponding one of the 2D images 200 was captured. If desired, the camera positions 210 may provide camera location and/or orientation in absolute terms (for example, through the use of a GPS sensor), or alternatively, relative to other camera positions 210 or to a main object about which the rotograph 119 is to provide animated rotation. The camera positions 210 may optionally facilitate positioning of the 2D images 200 in the 3D scene, as will be described subsequently.

The camera settings 220 may include data indicating settings applicable to the camera (for example, the image capture apparatus 107) when the corresponding one of the 2D images 200 was captured. The camera settings 220 may include parameters such as field-of-view, zoom level, F-stop setting, aperture, and/or other settings known in the image capture arts. The camera settings 220 may also optionally be used to facilitate positioning of the 2D images 200 in the 3D scene, as will be described subsequently.

The main object ID's 230 may each include data identifying the main object in the corresponding one of the 2D images 200. The main object ID's 230 may include raster coordinates in two-dimensional space and/or other designations of the portion of each of the 2D images 200 that represents the main object. Thus, for example, if the first 2D image 202 represents an architectural feature as the main object, the main first main object ID 232 may include a designation of the portion of the first 2D image 202 that corresponds to the architectural feature. The main object ID's 230 may also facilitate positioning of the 2D images 200 in the 3D scene, as will be described subsequently.

The main axis ID's 240 may each include data identifying the main axis in the corresponding one of the 2D images 200. The main axis ID's 240 may each include a vector, X-coordinate in two-dimensional space, and/or other designation of the axis defined by the main object identified in the corresponding one of the main object ID's 230. Thus, for example, if the first 2D image 202 represents an architectural feature as the main object and the main first main object ID 232 includes a designation of the portion of the first 2D image 202 that corresponds to the architectural feature, the first main axis ID 242 may include a designation of the main axis of the architectural feature within the first 2D image 202. The main axis ID's 240 may also facilitate positioning of the 2D images 200 in the 3D scene, as will be described subsequently.

The elements of FIG. 2 are merely examples of image data 109 that may be stored to facilitate the generation of the rotographs 119. Those of skill in the art will recognize that various other data may advantageously be captured, stored, and/or used in the generation of rotographs 119 in connection with the present disclosure.

Rotograph Generation From 2D Images

In one embodiment, the system generates a rotograph 119 from a series of 2D image, such as the 2D images 200 of FIG. 2. The rotograph 119 may present the impression of immersion in the environment in which the 2D images 200 were captured. This may be accomplished by creating a 3D scene illustrating a main object from the 2D images 200. A rotograph 119 may be generated by animating rotation of a virtual camera about an axis of rotation within the 3D scene, as will be described in greater detail subsequently.

Figure 3:
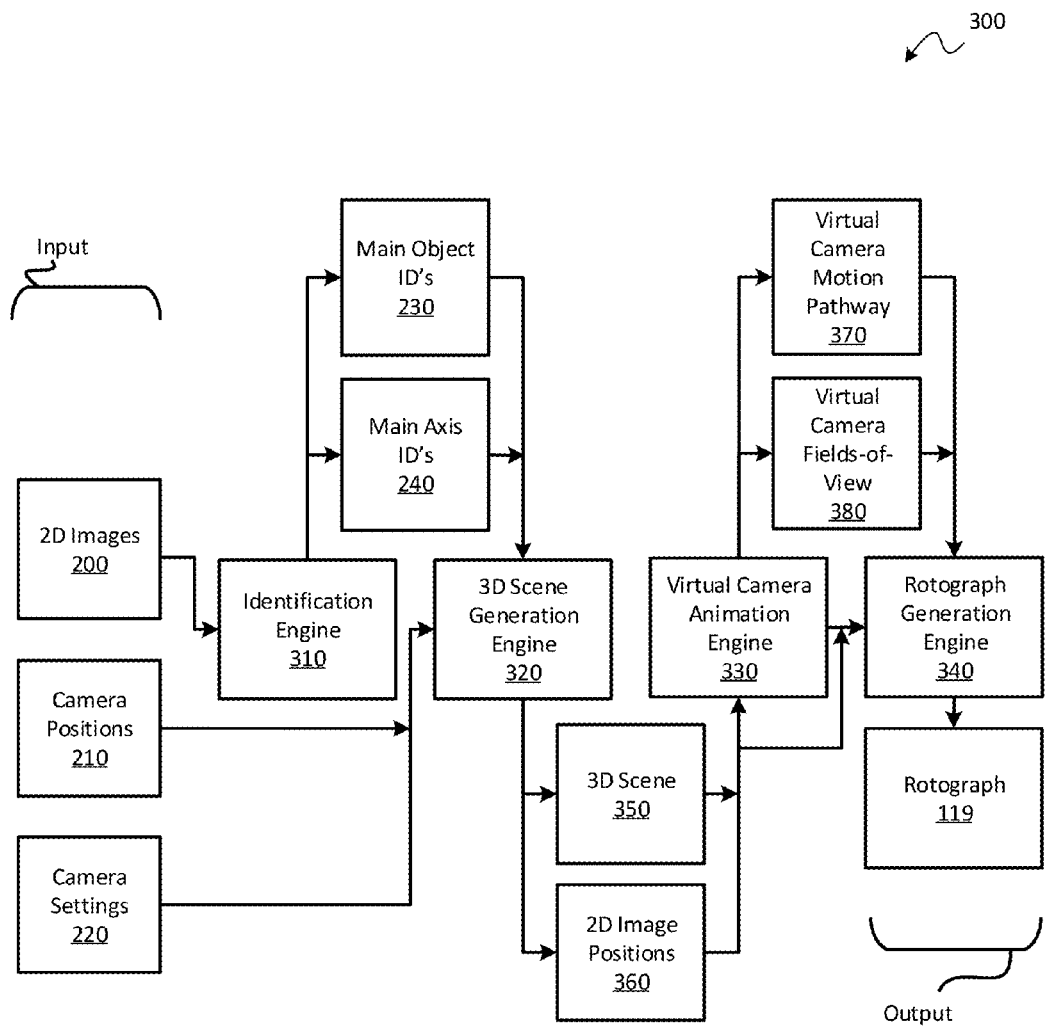
FIG. 3 is a block diagram depicting a system for generating a rotograph from a plurality of 2D images according to one embodiment.

Referring to FIG. 3, a schematic block diagram illustrates a system 300 for generating rotographs 119 from 2D images 200, according to one embodiment. The system 300 may include modules that are implemented by one or more of the components of FIGS. 1A and/or 1B.

As shown, the system 300 may include an identification engine 310, a 3D scene generation engine 320, a virtual camera animation engine 330, and/or a rotograph generation engine 340. The identification engine 310, a 3D scene generation engine 320, a virtual camera animation engine 330, and the rotograph generation engine 340 may cooperate to generate a rotograph 119 from the 2D images 200. The system 300 may receive the 2D images 200 and optionally, the camera positions 210 and/or the camera settings 220, as inputs, and may generate one or more rotographs 119 as outputs.

The identification engine 310 may receive the 2D images 200 as inputs. The identification engine 310 may identify the main object in each of the 2D images 200, and may provide, as output, the main object ID's 230 for the 2D images 200. Similarly, the identification engine 310 may identify the main axis of the main object in each of the 2D images 200, and may provide, as output, the main axis ID's 240 for the 2D images 200.

The identification engine 310 may use various methods to automatically identify the main object in each of the 2D images 200. In some embodiments, various feature and/or object recognition algorithms may be used to recognize and delineate objects that are likely to be main object, such as architectural objects and people. The position of such object within the 2D images 200 may help indicate whether they are, in fact, main objects. For example, objects that are centered, left-to-right, within the 2D images 200 may be assumed to be main objects, while an assumption may be made that objects significantly displaced from the center of the 2D images 200 are not main objects. Other characteristics, such as coloration, contrast, and/or the like may be used to automatically identify the portion of each of the 2D images 200 that corresponds to the main object.

Face recognition algorithms represent one of the different approaches to detect the main object in the 2D images 200 because pictures of people are likely to be captured and/or manipulated by a user. In other embodiments, other detection approaches can be used in addition to or in place of face recognition.

Main object identification may be carried out independently for each of the 2D images 200. Alternatively, identification of the main object in one of the 2D images 200 may be performed with reference to one or more other 2D images 200, for example, to compare features of a suspected main object between 2D images 200 to conclude that it is, indeed, the main object in the 2D image 200 being analyzed.

In addition to or in the alternative to the automatic analysis mentioned above, the main object in one or more of the 2D images 200 may be identified by the user. For example, the user may use the input device 102 to tap, click, and/or drag to define a boundary between the main object and the remainder of each of the 2D images 200. Any known selection tools may be used, such as bounding boxes, lassos, rectangular windows, and/or the like. Thus, the user may provide input to help the identification engine 310 obtain the main object ID's 230.

The main axis ID's 240 may be automatically obtained by the identification engine 310 in various ways. In some embodiments, each of the main object ID's 230 may be used to obtain the corresponding one of the main axis ID's 240. For example, the identification engine 310 may assume that the main object in each of the 2D images 200 is upright, and may identify the main axis as the geometric center, left-to-right, of the main object of the corresponding main object ID 230. Additionally or alternatively, the identification engine 310 may identify mirror and/or radial symmetry within the main object of the corresponding main object ID 230, and may use the geometry and/or other features of the main object to identify the axis of symmetry of the main object, which may be recorded as the main axis ID 240 for that 2D image 200. Other methods of identifying the center of an object may be used.

Additionally or alternatively, the main axis ID's 240 may also be generated through the use of user input. For example, the user may use the input device 102 to tap, click, and/or drag to define a line that is the main axis of the main object in each of the 2D images 200. Any known line drawing tools may be used, such as tools that permit the user to click and drag, select two points to define the line, and/or the like. Thus, the user may provide input to help the identification engine 310 obtain the main axis ID's 240.

The 3D scene generation engine 320 may generate a 3D scene 350 in which the 2D images 200 can be inserted. The 3D scene may define an axis of rotation for the rotograph 119, and a virtual camera for which animation about the axis of rotation can be animated. This will be shown and described in greater detail subsequently. In some embodiments, the same 3D scene 350 may be used for any rotograph 119. Thus, the image data 109 pertinent to a given set of the 2D images 200 need not necessarily be used to generate the 3D scene 350.

Further, the 3D scene generation engine 320 may position the 2D images 200 in the 3D scene 350. The result may be definition of a plurality of 2D image positions 360 within the 3D scene 350. Each of the 2D image positions 360 may define the position and/or orientation of one of the 2D images 200 within the 3D scene 350.

The 2D image positions 360 may be obtained in various ways. If desired, each of the 2D images 200 may be positioned in the 3D scene 350 such that the main axis (from the main axis ID's 240) of each of the 2D images 200 is aligned with (i.e., collinear with) the axis of rotation of the 3D scene 350. The 2D images 200 may optionally be positioned at the same elevation along the axis of rotation. Then, the 2D images 200 may be arranged in different orientations about the axis of rotation.

In some examples, the camera positions 210 may be used to determine the appropriate orientation for each of the 2D images 200. More specifically, each of the camera positions 210 may specify the angle from which the corresponding one of the 2D images 200 was obtained; the corresponding 2D image 200 may be oriented perpendicular to this capture angle so that the 2D images 200 are all oriented perpendicular to the viewpoint from which they were obtained, as would be expected by the viewer of the rotograph 119. The camera settings 220 may also optionally be used to help obtain the proper orientations of the 2D images 200.

In alternative embodiments, the camera positions 210 and/or the camera settings 220 need not be used. Rather, the 2D images 200 may be displaced from each other at one or more predetermined angular displacements. If the 2D images 200 were captured in an order consistent with rotation about the main axis of the main object of the 2D images 200, the 2D images 200 may simply be displaced angularly from each other in the order in which they were captured.

For example, if the user captures the 2D images 200 with the image capture apparatus 107, he or she may walk clockwise around the main object and capture eight of the 2D images 200, with each of the 2D images 200 captured after rotating approximately 45° around the main object. The 3D scene generation engine 320 may then orient the 2D images 200 such that each of the 2D images 200 is angularly displaced by 45° from the preceding one of the 2D images 200, thereby matching the actual camera viewpoints used to capture the 2D images 200.

In such a method, a single, constant angular displacement may be used between each pair of adjacent 2D images 200. If desired, this angular displacement may be the same for all rotographs 119 (for example, 45° between the adjacent 2D images 200 of all rotographs 119). In the alternative, a variable angular displacement may be used, but may provide for a constant angular displacement for each rotograph 119. For example, the user may capture the 2D images 200 from any desired number of viewpoints. The 3D scene generation engine 320 may simply divide 360° by the number of images captured to obtain the angular displacement between each adjacent pair of the 2D images 200.

In yet other alternative embodiments, a variable angular displacement may be used within a single rotograph 119. For example, a small angular displacement between adjacent 2D images 200 may be used to simulate slow rotation within a rotograph 119, while in a different portion of the same rotograph 119, a larger angular displacement between adjacent 2D images 200 may be used to simulate more rapid rotation about the main object.

The 3D scene generation engine 320 may map each of the 2D images 200 to a plane positioned at the desired position and orientation. Optionally, any known texture mapping technique may be used. Such texture mapping techniques may apply the 2D image 200 as a flat cover (i.e., like wallpaper). Additionally or alternatively, such texture mapping techniques may provide actual texturing (for example, by adding bumps to the 3D geometry) or the appearance of texturing (for example, by adding shadows at the appropriate locations to simulate the appearance of surface irregularities). Additionally or alternatively, other effects such as full or partial transparency, self-illumination, or the like may be used.

The 3D environment may optionally include other elements known in the 3D modeling, rendering, and/or animation arts, such as light sources. In lieu of light sources, the 3D environment may simply be rendered through the use of one or more ambient lighting parameters. If desired, the lighting applied to the 3D environment may be adjustable by the user.

The virtual camera animation engine 330 may receive the 3D environment, which may include the 3D scene 350 and the 2D image positions 360, and may animate the virtual camera within the 3D scene 350 to provide a virtual camera motion pathway 370 and/or virtual camera fields-of-view 380. The virtual camera motion pathway 370 may define rotation of the virtual camera about the axis of rotation. The virtual camera fields-of-view 380 may change as needed to ensure that the field-of-view of the virtual camera is always entirely occluded by the 2D images 200.

In some embodiments, the virtual camera motion pathway 370 may consist of arcs defined between each adjacent pair of the 2D images 200. The arcs may be aligned, end-to-end, so that the virtual camera motion pathway 370 is substantially continuous. Each of the arcs may be centered at the axis of rotation. Further, the radius of each arc relative to the axis of rotation may be equivalent to the distance at which the virtual camera's field-of-view is bounded by 2D image toward which it is oriented. Each of the arcs may have an end point within a plane passing through the axis of rotation, perpendicular to the corresponding one of the 2D images 200. Thus, when positioned at either end of the arc, the virtual camera may be aligned to directly view one of the pair of 2D images 200 that defines the end points of the arc.

All of the arcs of the virtual camera motion pathway 370 may optionally be positioned within a single plane, so that the rotograph 119 does not define an elevation change. In the alternative, one or more of the arcs, either collectively or individually, may define one or more elevation changes. In some embodiments, the virtual camera motion pathway 370 may define a helical pathway so that the virtual camera rises or falls (either at a constant or variable rate) relative to the 2D images.

The virtual camera animation engine 330 may also define the timing along which the virtual camera moves along the virtual camera motion pathway 370. In some embodiments, the virtual camera may move along the virtual camera motion pathway 370 at constant speed. In other embodiments, the virtual camera may move along the virtual camera motion pathway 370 at variable speed.

The arcs that make up the virtual camera motion pathway 370 may be of equal length and/or angular displacement, or may include multiple different lengths and/or angular displacements. If the lengths and/or angular displacements of the arcs are not equal, the virtual camera animation engine 330 may optionally normalize motion of the virtual camera so that the viewer has the impression of rotating about the axis of rotation at constant angular velocity. Alternatively, the virtual camera animation engine 330 may move the virtual camera in a manner that provides a variable angular velocity. For example, the virtual camera may take an equal length of time to traverse each of the arcs, regardless of the length of the arc, so that transitions between 2D images 200 that are separated by longer arcs appear to experience more rapid rotation of the user's viewpoint about the axis of rotation.

The rotograph 119 may be open or closed. A closed rotograph 119 may be viewable in a continuous loop, and thus need not have a predetermined beginning and/or ending. By contrast, an open rotograph 119 may have a start and an end, which may be associated with two different 2D images 200. For a closed rotograph 119, the arcs may be generated to connect each adjacent pair of the 2D images 200. In at least one embodiment, in case of an open rotograph 119, the first and last image in the rotograph 119 may not be linked by an arc.

In some embodiments, the user may select whether a closed or open rotograph 119 is to be generated. For an open rotograph 119, the user may have the option to select one of the 2D images 200 at which the rotograph 119 is to start, and another of the 2D images 200 at which the rotograph 119 is to end. Alternatively, the determination of whether to generate a closed or open rotograph 119 and/or the designation of the beginning and ending of an open rotograph 119 may be made automatically by the virtual camera animation engine 330.

For example, sensors such as GPS sensors (not shown) may encode information such as the camera positions 100 that can be used to ascertain whether the 2D images 200 define a full circle. Additionally or alternatively, comparison of the first and last 2D images 200 in the captured sequence of the 2D images 200 may be used to determine whether the 2D images 200 define a full circle. If the 2D images 200 do define a full circle, the virtual camera animation engine 330 may infer that they are to be used to generate a closed rotograph 119. Conversely, if the 2D images 200 do not define a full circle, the virtual camera animation engine 330 may infer that they are to be used to generate an open rotograph 119.

The virtual camera fields-of-view 380 may be selected such that only the 2D images 200 are visible by the virtual camera. Thus, at each location of the virtual camera along the virtual camera motion pathway 370, the field-of-view may be set such that the field-of-view is entirely occupied by the 2D images 200 that are visible from that location. In some embodiments, the virtual camera fields-of-view 380 may be set such that some or all edges of the virtual camera fields-of-view 380 are aligned with the edges of the 2D images 200.

In other embodiments, the virtual camera fields-of-view 380 may be set such that some portions of the 2D images 200 extend beyond the edges of the virtual camera fields-of-view 380. If desired, the virtual camera fields-of-view 380 may be selected to keep the main object at substantially the same size throughout the rotograph 119. Thus, if the zoom levels of the 2D images 200 are significantly different from each other, or if the viewpoints from which the 2D images 200 are captured vary significantly in proximity to the main object, some of the virtual camera fields-of-view 380 may be set to exclude portions of the 2D images 200 to keep the main object at a relatively consistent size within the rotograph 119. The camera positions 210 and/or camera settings 220 may optionally be used to establish the optimal settings for the virtual camera fields-of-view 380.

The rotograph generation engine 340 may use the 3D scene 350, the 2D image positions 360, the virtual camera motion pathway 370, and the virtual camera fields-of-view 380 to generate the rotograph 119. This may entail rendering the 3D scene 350 from the point of view of the virtual camera to generate successive 2D images that, when played in rapid succession, provide the impression of motion. Any of a wide variety of rendering techniques may be applied, as known in the 3D modeling, rendering, and/or animation arts. The rotograph 119 may be stored in any suitable animation and/or image format. The rotograph 119 may be displayed for the user, for example, on the display screen 103.

For virtual camera positions at the end points of arcs, the rotograph 119 may display the corresponding one of the 2D images 200. The zoom level, lighting, texture, and/or other attributes of the 2D image 200 may be modified by virtue of the settings with which the 2D image 200 is rendered in the 3D scene 350. Optionally, at camera positions between the end points of an arc, the rotograph 119 may display a blend of the 2D images 200 at the end points of the arc. The blend may be in proportion to the position of the virtual camera along the arc. For example, if the virtual camera is nearer a first end point than to a second end point of the arc, the rotograph 119 may display an image that has more similarity to the image corresponding to the first end point than to the image corresponding to the second end point.

In some embodiments, blending may be carried out in a manner similar to that disclosed in connection with transitioning between images in related U.S. Utility application Ser. No. 13/226,695 for "Generating Three-Dimensional Virtual Tours from Two-Dimensional Images," filed Sep. 7, 2011 and issued on Apr. 22, 2014 as U.S. Pat. No. 8,705,892, which is incorporated herein by reference. For example, the rotograph generation engine 340 may render a frame that is the sum of a first image of the 2D images 200 that corresponds to the first end point of the arc, and a second image of the 2D images 200 that corresponds to the second end point of the arc. The frame may be a combination (such as a sum) of the first image and the second image. Each pixel of the frame may have an alpha coefficient used to weight the contribution of each of the first and second images. Alpha values may change with the position of the virtual camera along the arc. In this way, the relative weights of the first and second images can be dynamically controlled, leading to a relatively smooth animation along the arc that lends the impression of rotation of the main object.

Method

Figure 4:
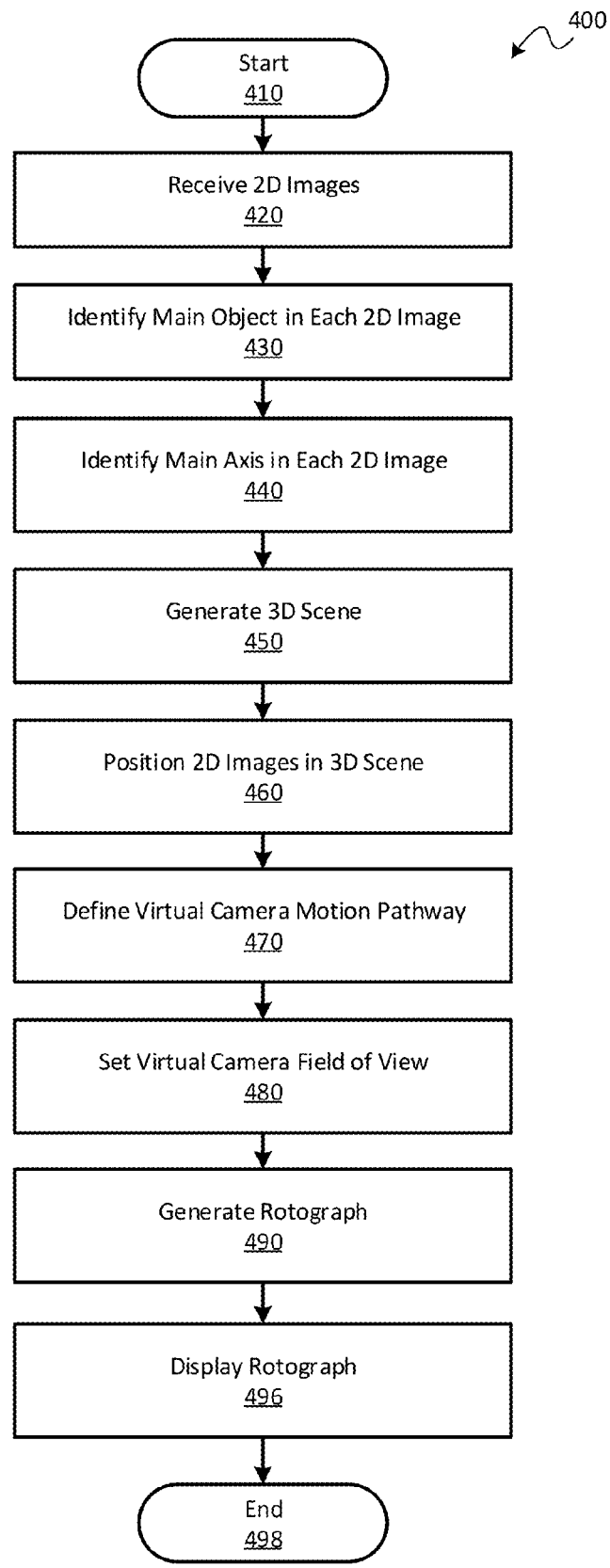
FIG. 4 is a flow diagram depicting a method of creating a rotograph, according to one embodiment.

Referring to FIG. 4, a flow diagram illustrates a method 400 for generating a rotograph 119 from a set of 2D images 200, according to one embodiment. The following description of the method 400 will be provided with reference to the system 300 of FIG. 3. However, in alternative embodiments, the method 400 may be performed with a variety of differently-configured systems. Further, in alternative embodiments, the system 300 may be used to carry out a variety of methods in addition to or in place of the method 400 of FIG. 4.

As shown, the method 400 may start 410 with a step 420 in which the 2D images 200 are received. As mentioned previously, this may involve capture of the 2D images 200 by the user 100 via image capture apparatus 107 at device 101 and/or client device 108. Additionally or alternatively, the step 420 may involve selection of a set of 2D images 200 stored in the data store 106. In some embodiments, the step 420 may involve receipt of the 2D image 200 from another computing system. For example, 2D images 200 embedded in a web site or document may be used by the system 300. Additionally or alternatively, 2D images 200 may be attached to and/or embedded in an e-mail, a text message, or other communications between users. Any such 2D images 200 may be selected by the user 100 and/or automatically selected for processing by the system 300.

In a step 430, the main object in each of the 2D images 200 may be identified. This may be done manually and/or automatically by the identification engine 310, as described previously. The main object ID 230 for each of the 2D images 200 may be recorded.

In a step 440, the main axis of each of the 2D images 200 may be identified. This may be done by automatically analyzing the main object ID 230 for each image to locate a centerline and/or axis of symmetry in the identification engine 310, as described previously. The main axis ID 240 for each of the 2D images 200 may be recorded.

In a step 450, the 3D scene 350 may be generated. The 3D space, axis of rotation, and virtual camera may all be created. This may be carried out by the 3D scene generation engine 320.

In a step 460, the 2D image positions 360 may also be established to position the 2D images 200 within the 3D scene 350, as set forth previously. The 2D images 200 may be arranged in varying angular displacements about the axis of rotation, with the main axis of each 2D image 200 collinear with the axis of rotation by the 3D scene generation engine 320, as described previously.

In a step 470, the virtual camera motion pathway 370 may be generated by the virtual camera animation engine 330. This may be done by generating arcs that define segments of the virtual camera motion pathway 370 between each adjacent pair of the 2D images 200, as described previously.

In a step 480, the virtual camera fields-of-view 380 may be generated by the virtual camera animation engine 330. This may be done by setting the field-of-view of the virtual camera to be fully occluded by the associated 2D image 200 at each end point of each arc of the virtual camera motion pathway 370, as described previously.

In a step 490, the rotograph 119 may be generated by the rotograph generation engine 340. The rotograph 119 may be an open or closed rotograph 119 as mentioned previously. This and other characteristics of the rotograph 119 may be selected by the user through the use of the input device 102.

In a step 496, the rotograph 119 may be displayed for the user. This may be done, for example, on the display screen 103. The method 400 may then end 498.

EXAMPLES

Various examples of the operation of the system 300 and/or the method 400 will be shown and described in connection with FIGS. 5A through 12B, as follows.

Figure 5A:
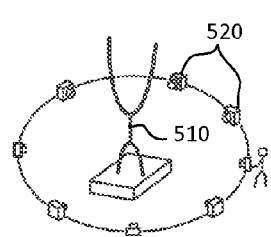
FIGS. 5A and 5B depict the capture of 2D images of an architectural object from multiple viewpoints, and the identification of a main object and a main axis in each of the 2D images, according to one embodiment.
Figure 5B:
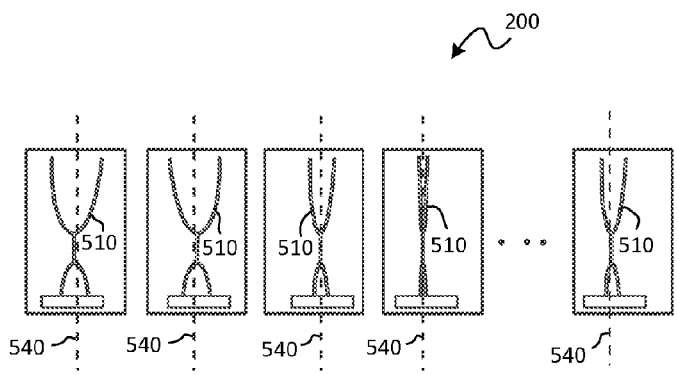

FIGS. 5A and 5B depict the capture of 2D images 200 of an architectural object from multiple viewpoints 520, and the identification of a main object 510 and a main axis 540 in each of the 2D images 200, according to one embodiment. The viewpoints 520 may be spaced around the main object 510 to capture the main object 510 from all sides such that a closed rotograph 119 can be generated. The 2D images 200 depict the main object 510 from various vantage points. As it can be appreciated, sometimes the center of the 2D image 200 does not coincide with the center of the main object 510.

Figure 5C:
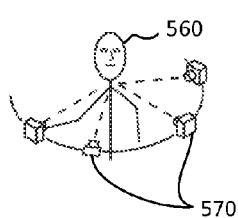
FIGS. 5C and 5D depict the capture of 2D images of a person from multiple viewpoints, and the identification of a main object and a main axis in each of the 2D images, according to one embodiment.
Figure 5D:
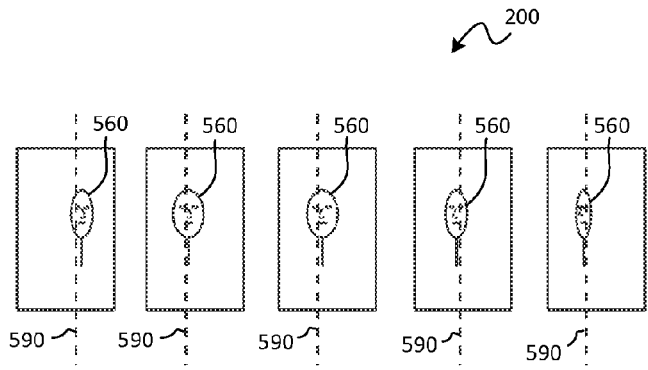

FIGS. 5C and 5D depict the capture of 2D images of a person from multiple viewpoints 570, and the identification of a main object 560 and a main axis 590 in each of the 2D images 200, according to one embodiment. The viewpoints 570 may be spaced around the front side of the main object 510 to capture the main object 560 such that an open rotograph 119 can be generated, showing only rotation about the front side of the main object 560. The 2D images 200 depict the front side of the main object 560 from various vantage points. Again, the center of the 2D image 200 may not necessarily coincide with the center of the main object 560.

Figure 6:
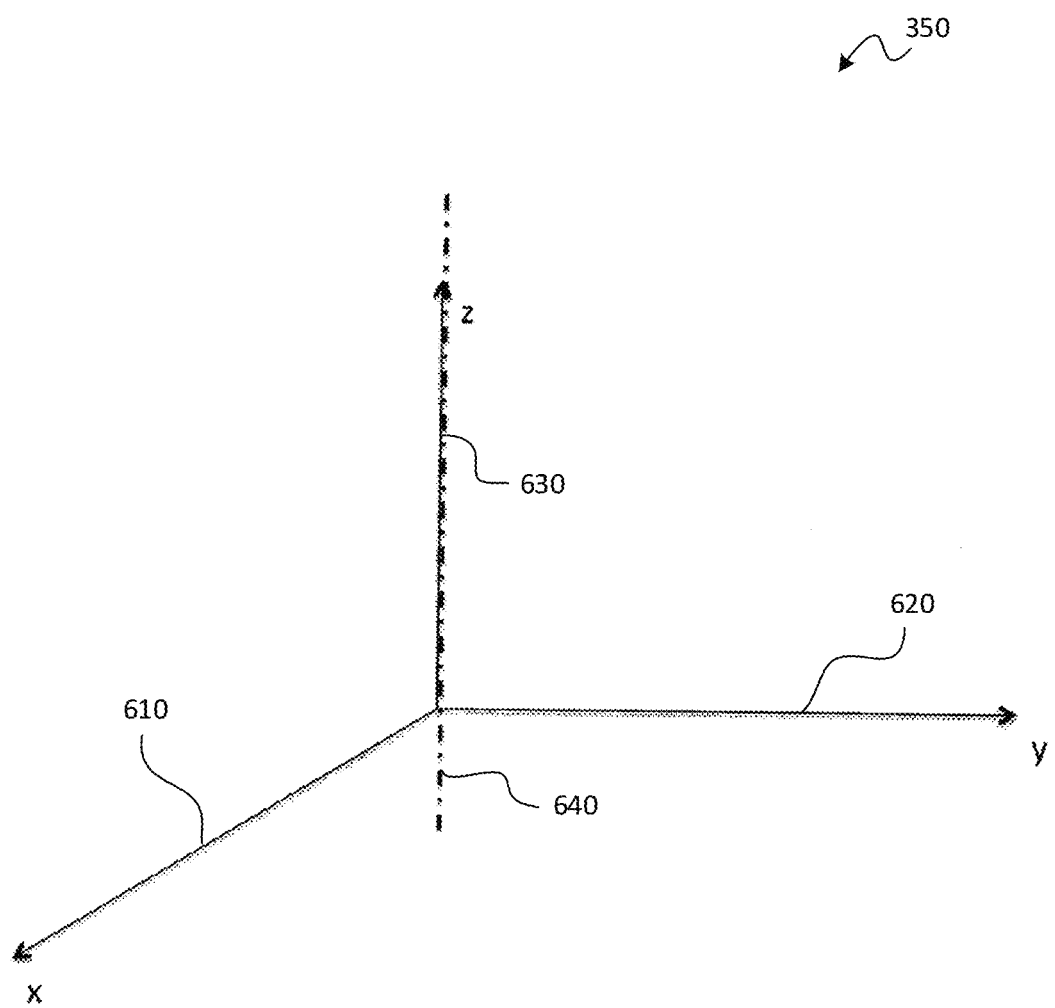
FIG. 6 depicts a 3D scene in which the 2D images can be inserted, according to one embodiment.

FIG. 6 depicts a 3D scene 350 in which the 2D images 200 can be inserted, according to one embodiment. The 3D scene 350 may optionally be defined in Cartesian coordinates, with an X-axis 610, a Y-axis 620, and a Z-axis 630. An axis of rotation 640 may be defined such that it extends along the Z-axis 630. The virtual camera and the 2D images 200 may be placed in the 3D scene 350.

Figure 7A:
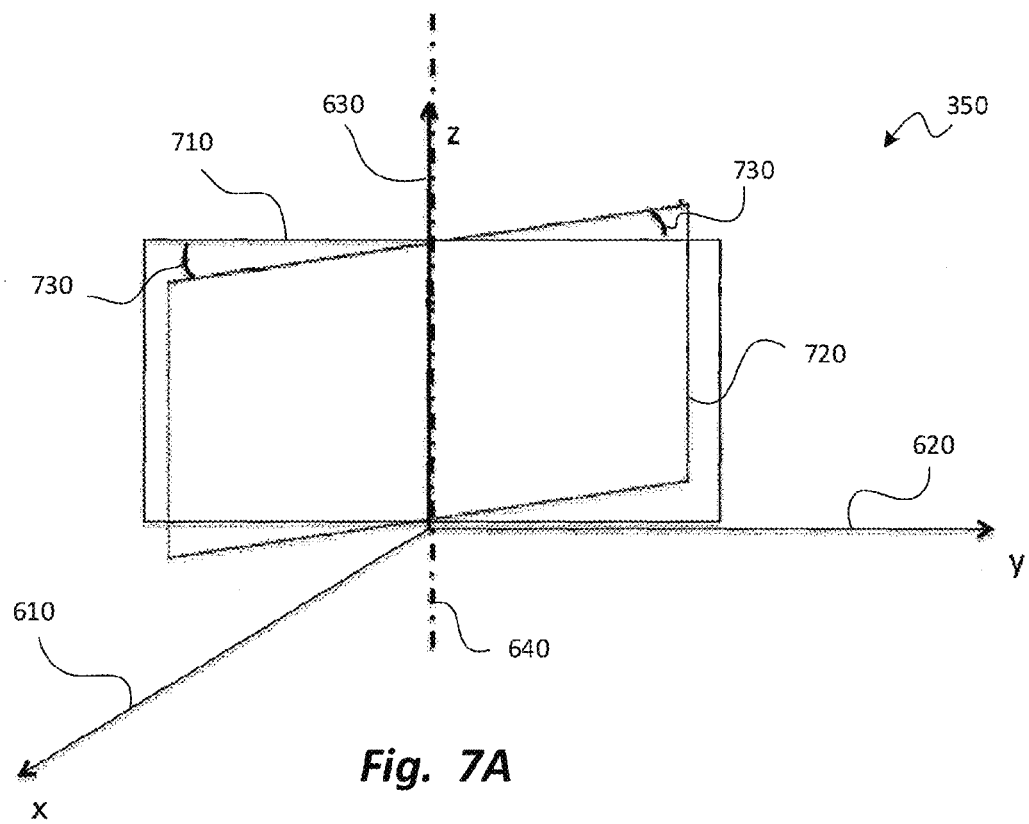
FIGS. 7A and 7B are isometric and top views, respectively, depicting positioning of two 2D images in the 3D scene, according to one embodiment.
Figure 7B:
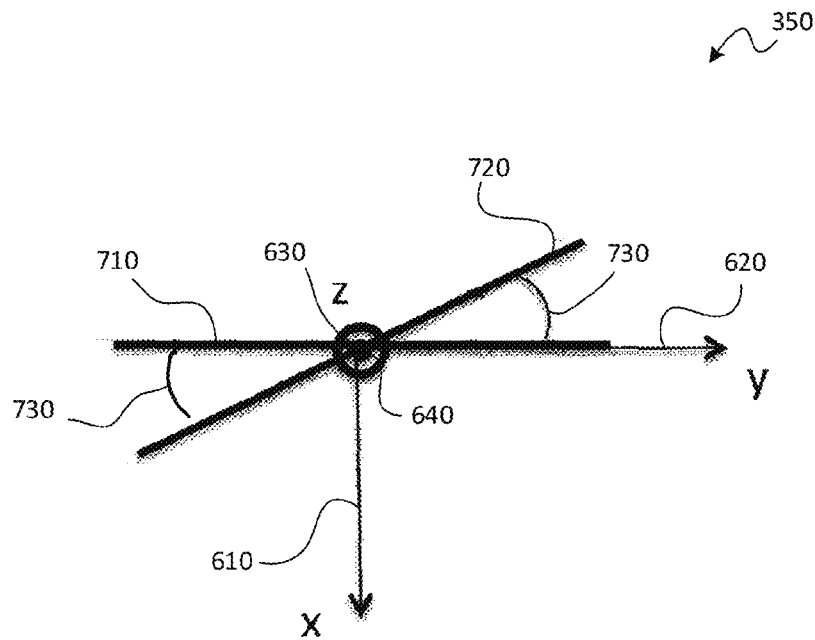

FIGS. 7A and 7B are isometric and top views, respectively, depicting positioning of two 2D images 200 in the 3D scene 350, according to one embodiment. Specifically, FIG. 7 illustrates positioning of a first 2D image 710 and a second 2D image 720 in the 3D scene 350. As shown, the first 2D image 710 and the second 2D image 720 may be positioned such that the main axis of each of the first 2D image 710 and the second 2D image 720 coincides with the axis of rotation 640 of the 3D scene 350. The second 2D image 720 may be angularly displaced from the first 2D image 710 by an angle 730.

Figure 8A:
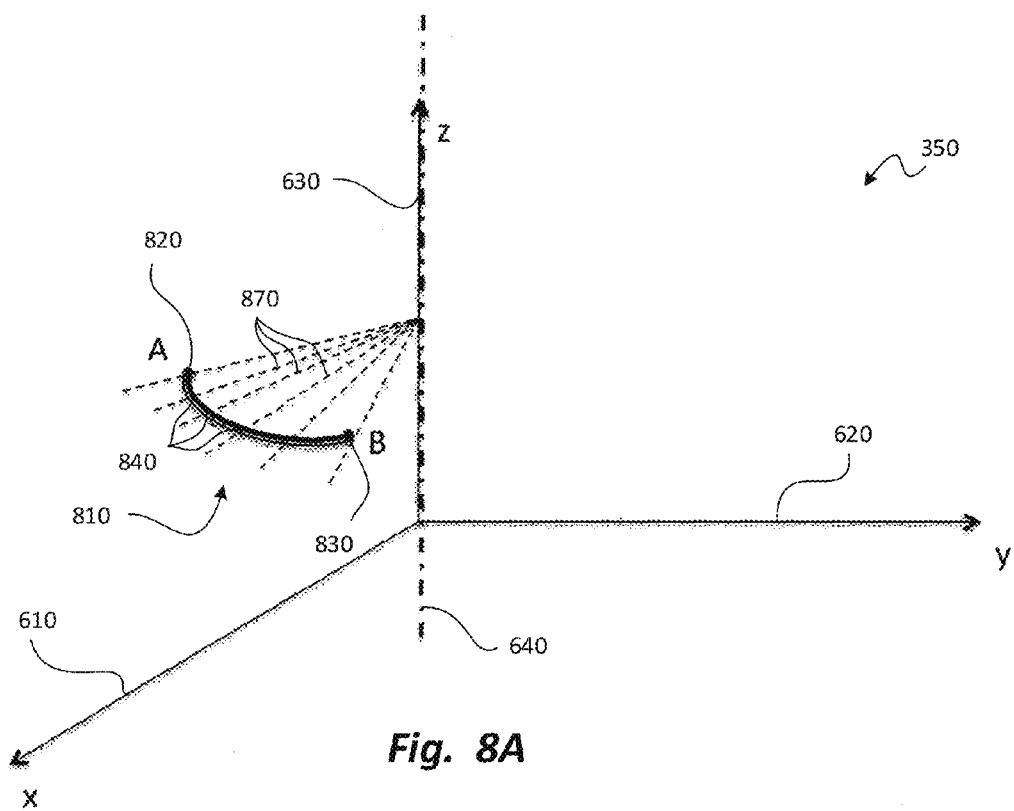
FIGS. 8A and 8B are isometric and top views, respectively, depicting an arc in relation to the 3D scene, according to one embodiment.
Figure 8B:
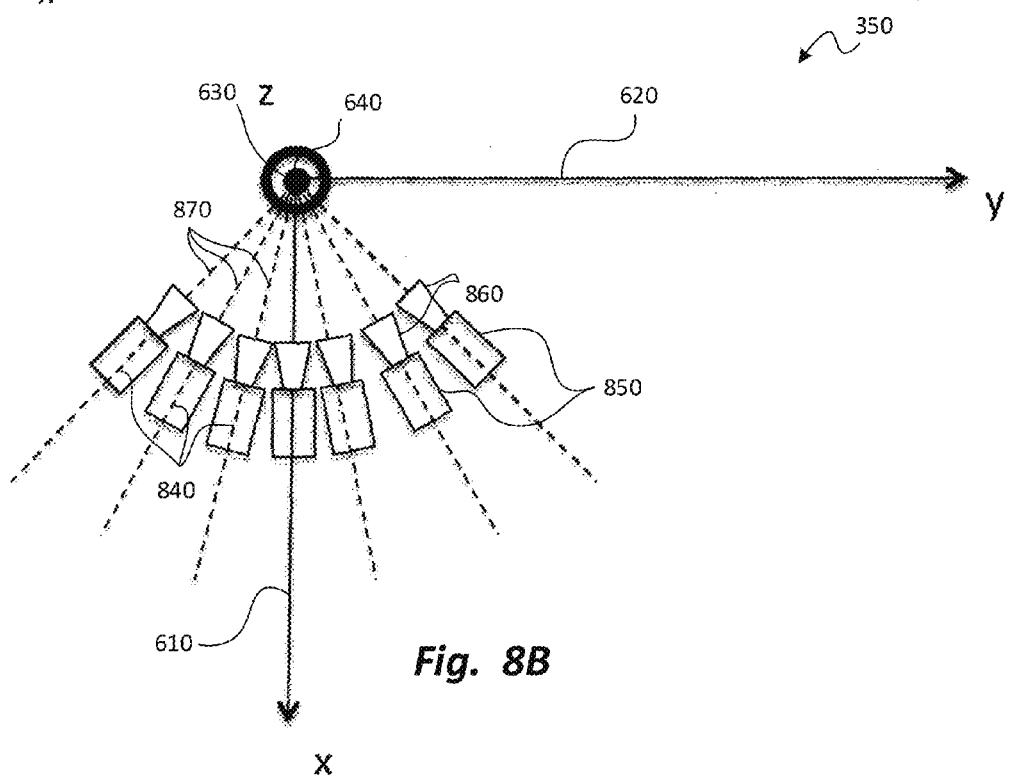

FIGS. 8A and 8B are isometric and top views, respectively, depicting an arc 810 that may be defined as part of the virtual camera motion pathway, according to one embodiment. The arc 810 may be centered at the axis of rotation 640 and may sweep through the angular displacement between two of the 2D images 200 (such as the first 2D image 710 and the second 2D image 720 of FIGS. 7A and 7B). The arc 810 may extend from a first end point 820 to a second end point 830.

FIGS. 8A and 8B illustrate the presence of a plurality of virtual camera positions 840 along the arc 810 that may be occupied by a virtual camera 850. As shown, in each of the virtual camera positions 840, the virtual camera 850 is aimed toward the axis of rotation 640. This is illustrated by rays 870 extending from the virtual camera 850 at each of the virtual camera positions 840 to the axis of rotation 640.

The virtual camera 850 may optionally have a fixed field-of-view 860. In such an embodiment, the radius of the arc 810 may optionally be fixed by the field-of-view 860 of the virtual camera 850. More specifically, the radius of the arc 810 may be set such that the field-of-view 860 is, at each of the virtual camera positions 840, at the most equivalent to the bounds of the 2D images 200.

Figure 9A:
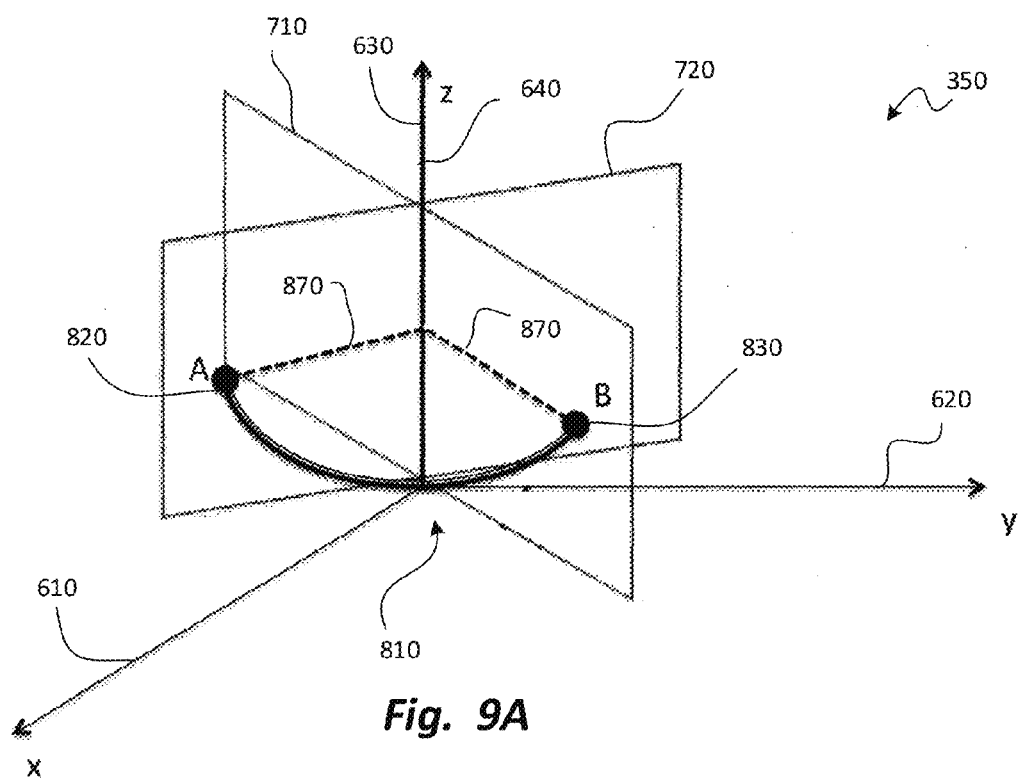
FIGS. 9A and 9B are isometric and top views, respectively, depicting how the arc of FIGS. 8A and 8B may be positioned in relation to the first and second 2D images of FIGS. 7A and 7B, according to one embodiment.
Figure 9B:
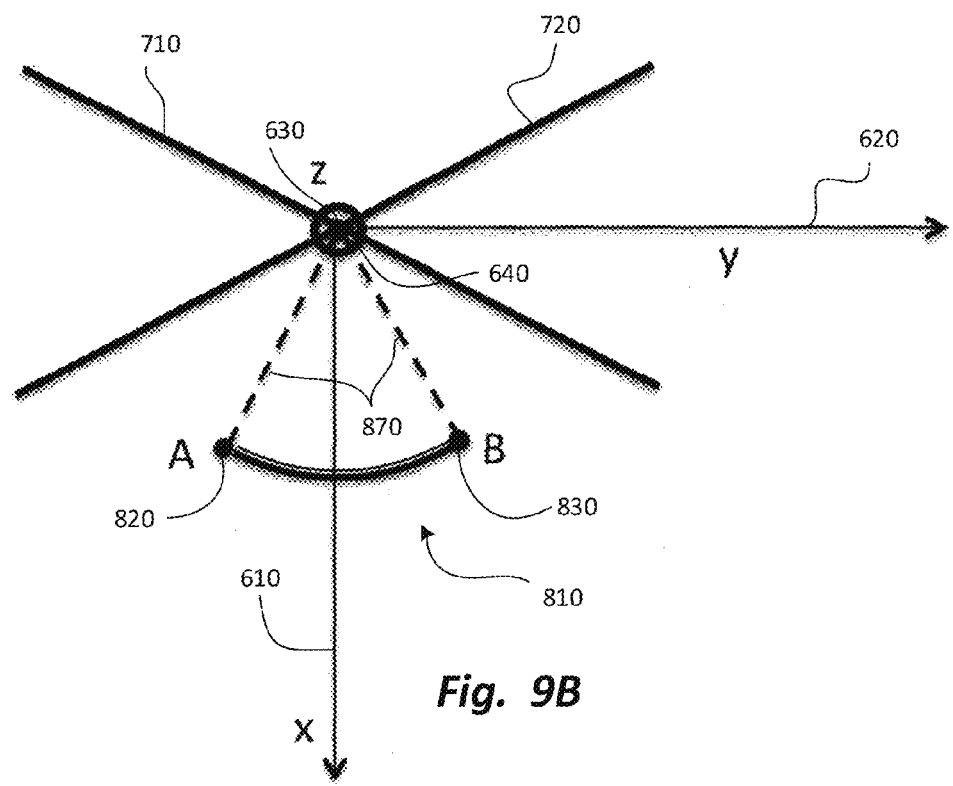

FIGS. 9A and 9B are isometric and top views, respectively, depicting how the arc 810 of FIGS. 8A and 8B may be positioned in relation the first 2D image 710 and the second 2D image of FIGS. 7A and 7B, according to one embodiment. The first end point 820 of the arc 810 may coincide with the ray 870 perpendicular to the first 2D image 710, passing through the main axis of the first 2D image 710 (i.e., the axis of rotation 640). Similarly, the second end point 830 of the arc 810 may coincide with the ray 870 perpendicular to the second 2D image 720, passing through the main axis of the second 2D image 720 (i.e., the axis of rotation 640).

Figure 10A:
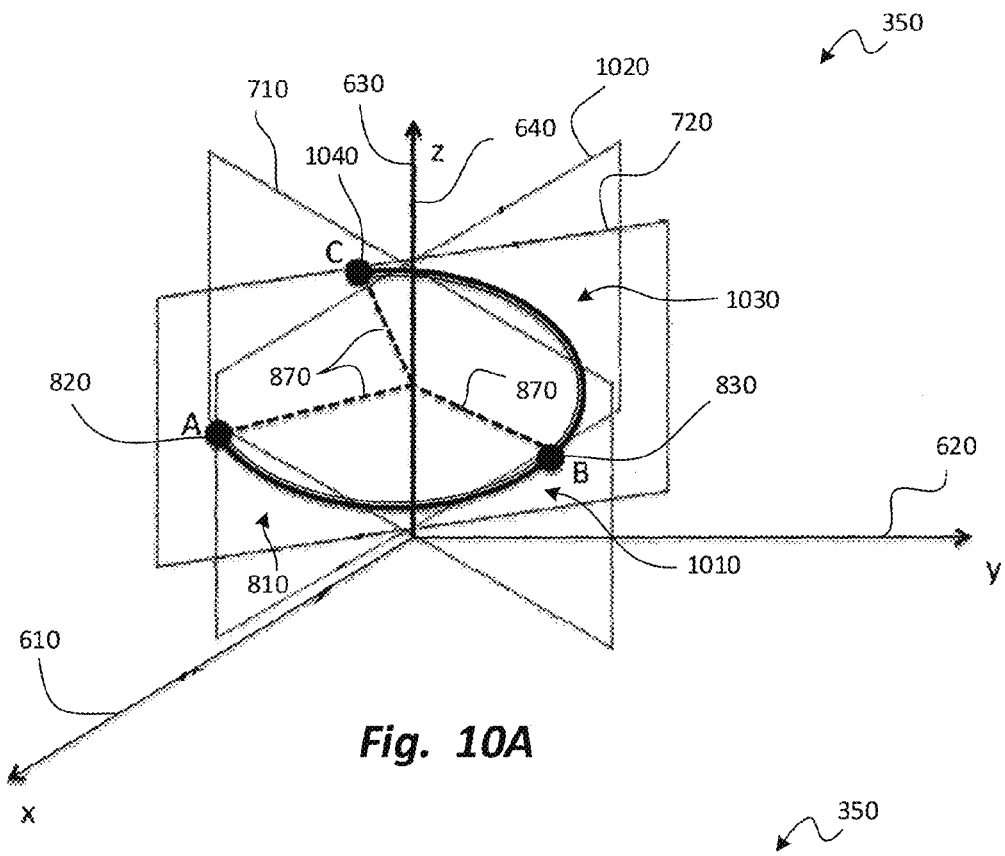
FIGS. 10A and 10B are isometric and top views, respectively, depicting a virtual camera motion pathway for an open rotograph, according to one embodiment.
Figure 10B:
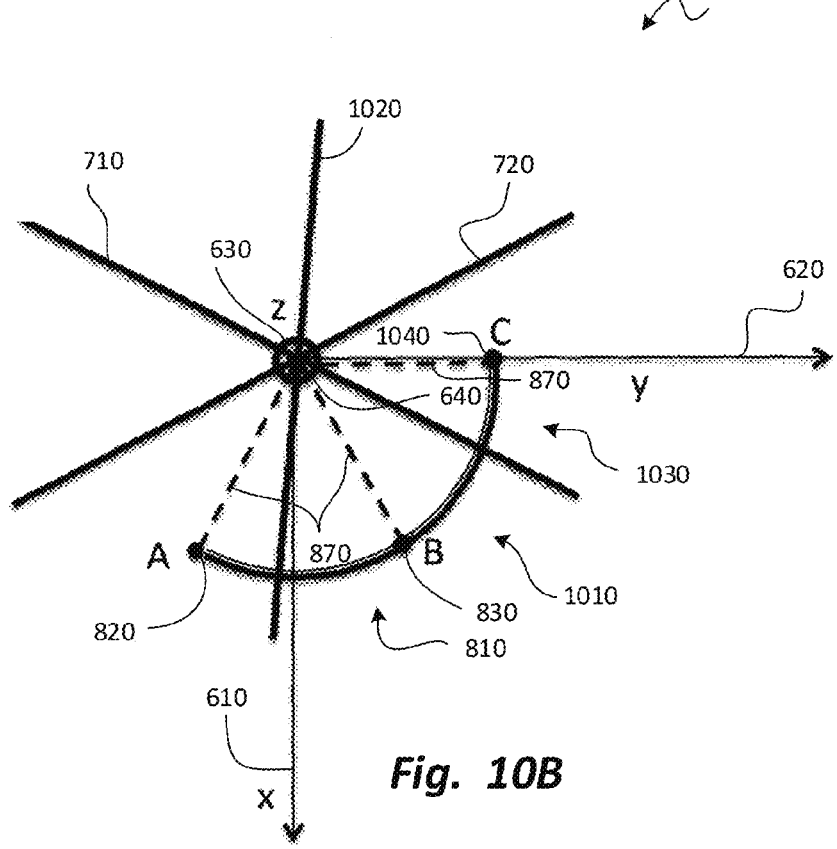

FIGS. 10A and 10B are isometric and top views, respectively, depicting a virtual camera motion pathway 1010 for an open rotograph, according to one embodiment. FIGS. 10A and 10B illustrate a third 2D image 1020, in addition to the first 2D image 710 and the second 2D image 720 of FIGS. 7A and 7B.

An arc 1030 may be positioned to define virtual camera motion from a position facing the second 2D image 720 to a position facing the third 2D image 1020. Like the arc 810, the arc 1030 may be centered at the axis of rotation 640. The arc 1030 may have, as end points, the second end point 830 of the arc 810 and a third end point 1040, positioned in a plane perpendicular to the third 2D image 1020, passing through the main axis of the third 2D image 1020 (i.e., the axis of rotation 640).

The arc 810 and the arc 1030, together, may define the virtual camera motion pathway 1010, extending from the first end point 820 to the third end point 1040. There may be no arc that directly connects the first end point 820 to the third end point 1040. Thus, the rotograph 119 that is generated by the virtual camera motion pathway 1010 may be an open rotograph 119, with a beginning at which the virtual camera is at the first end point 820 or the third end point 1040, and an ending at which the virtual camera is at the other of the first end point 820 and the third end point 1040.

Figure 11A:
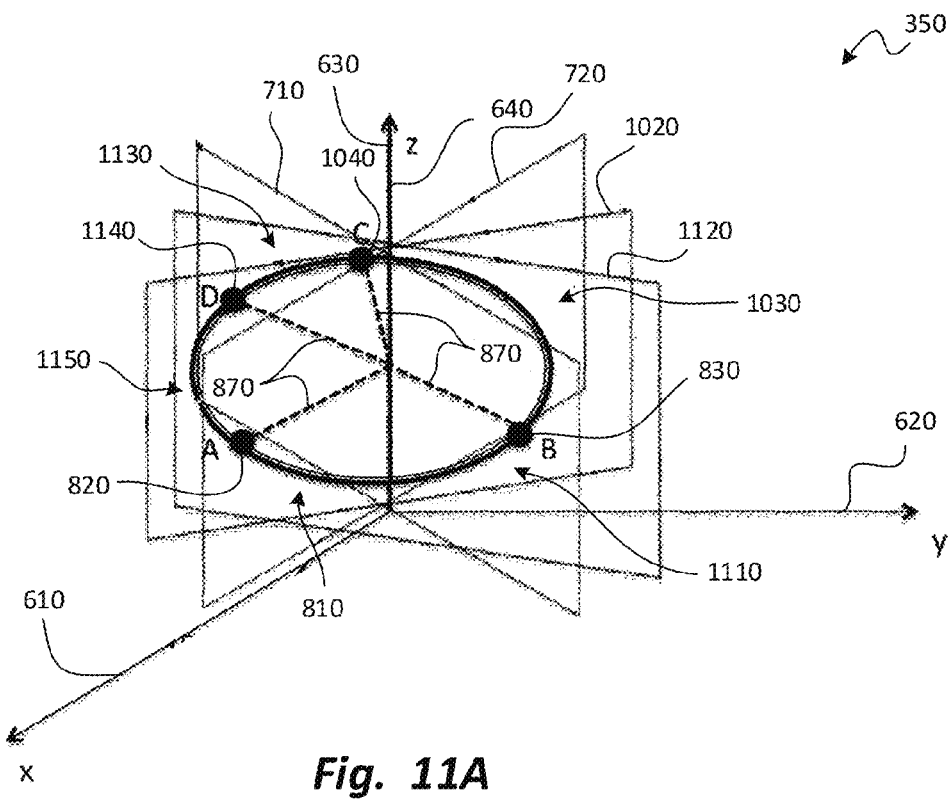
FIGS. 11A and 11B are isometric and top views, respectively, depicting a virtual camera motion pathway for a closed rotograph, according to one embodiment.
Figure 11B:
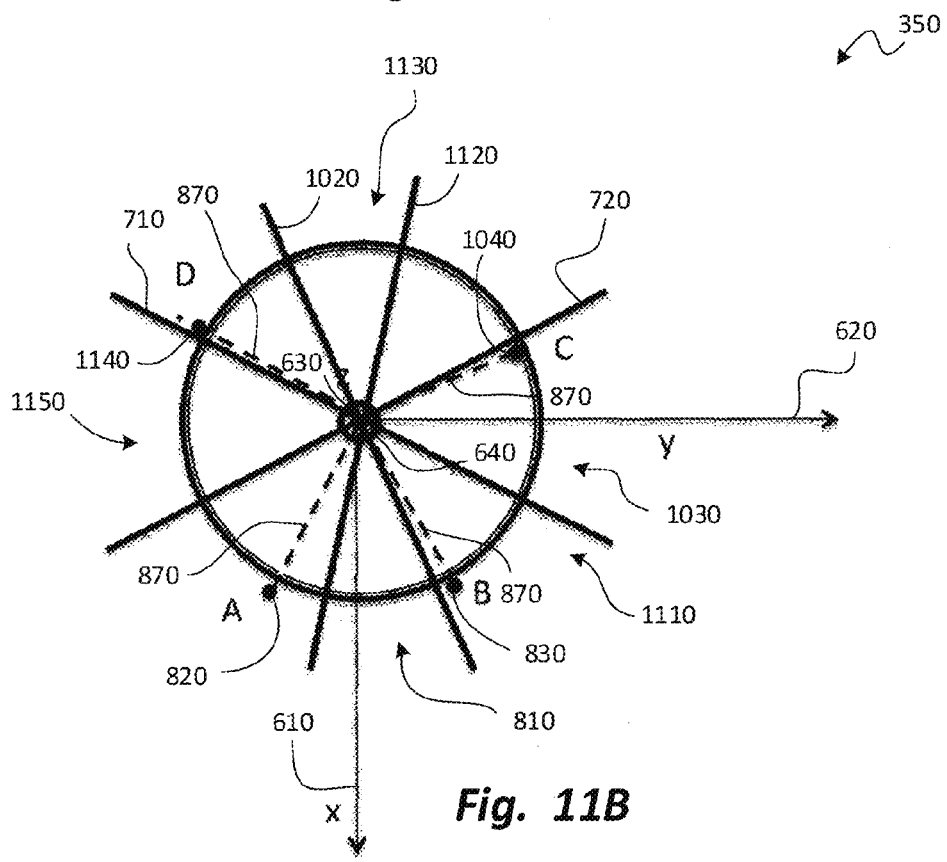

FIGS. 11A and 11B are isometric and top views, respectively, depicting a virtual camera motion pathway 1110 for a closed rotograph, according to one embodiment. FIGS. 11A and 11B illustrate a fourth 2D image 1120, in addition to the first 2D image 710, the second 2D image 720, and the third 2D image 1020.

An arc 1130 may be positioned to define virtual camera motion from a position facing the third 2D image 1020 to a position facing the fourth 2D image 1120. Like the arc 810 and the arc 1030, the arc 1130 may be centered at the axis of rotation 640. The arc 1130 may have, as end points, the third end point 1040 of the arc 810 and a fourth end point 1140, positioned in a plane perpendicular to the fourth 2D image 1120, passing through the main axis of the fourth 2D image 1120 (i.e., the axis of rotation 640). Further, the fourth end point 1140 and the first end point 820 may be connected together by an arc 1150 that is also centered at the axis of rotation 640.

The arc 810, the arc 1030, the arc 1130, and the arc 1150, together, may define the virtual camera motion pathway 1110, extending from the first end point 820 in a full circle back to the first end point 820. Since the virtual camera motion pathway 1110 extends full-circle, the rotograph 119 that is generated by the virtual camera motion pathway 1110 may be a closed rotograph 119, with no predetermined beginning or ending. The rotograph 119 may start or end at any arbitrary point along the virtual camera motion pathway 1110. If desired, the rotograph 119 may play in a continuous loop until playback is cancelled by the user.

Figure 12A:
FIGS. 12A and 12B are screenshot diagrams depicting a display resulting from motion of the virtual camera from the start to end point of an arc.
Figure 12B:

FIGS. 12A and 12B are screenshot diagrams 1200, 1250, respectively, depicting a display resulting from motion of the virtual camera from the start of an arc to the end point of the arc. In the initial position, the virtual camera's view may be the first 2D image 710, as shown in the screenshot diagram 1200 of FIG. 12A. In the final position, the virtual camera's view may be the second 2D image, 720, as shown in the screenshot diagram 1250 of FIG. 12B. During the motion of the virtual camera along the arc, the camera's view may be a combination (such as a sum) of the first 2D image 710 and the second 2D image 720, as described previously. To ensure a good user experience, an alpha-blend curve or some type of "mixing" can be applied to the user view in every camera position.

A wide variety of open and closed rotographs 119 may be generated through the use of the techniques and principles set forth herein. Some examples will be shown in FIGS. 13, 14, and 15, as follows.

Exemplary Rotographs

Figure 13:
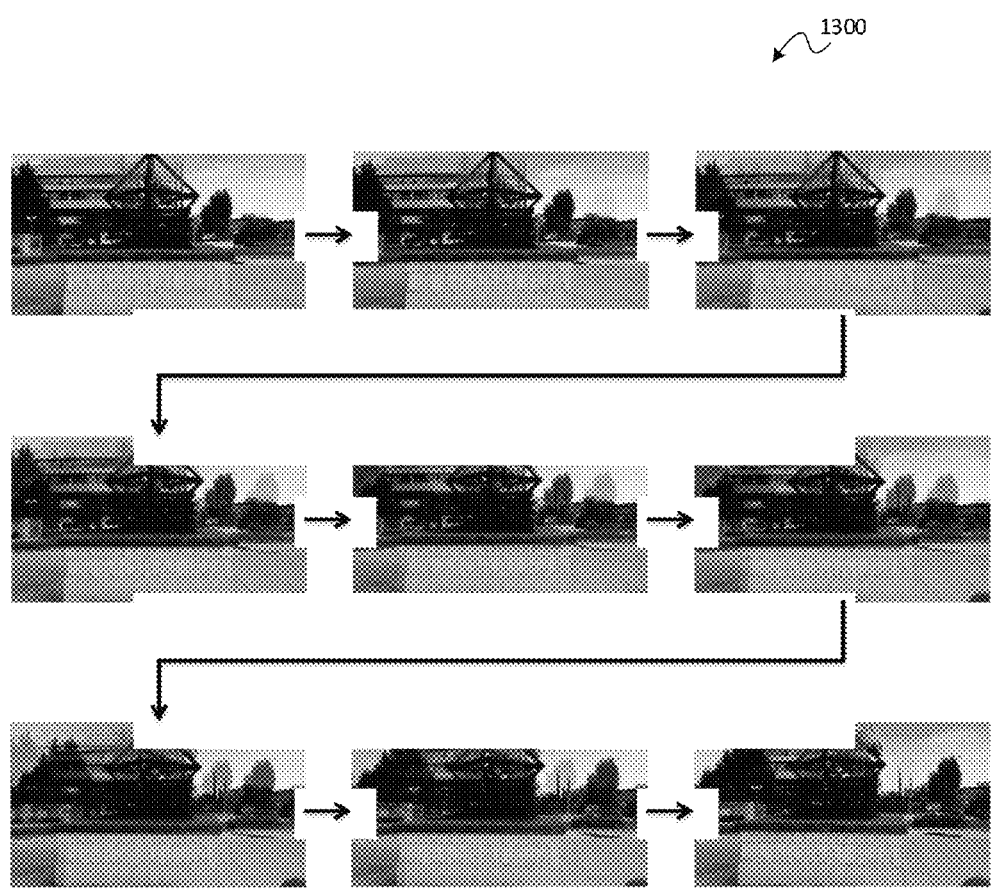
FIG. 13 is a set of screenshot diagrams illustrating the display of a rotograph of an architectural object, according to one embodiment.

FIG. 13 is a set of screenshot diagrams 1300 illustrating the display of a portion of rotograph 119 of an architectural object, according to one embodiment. The screenshot diagrams 1300 illustrate the view generated as the virtual camera moves along an arc passing between a view of the first 2D image 710 and the second 2D image 720, as shown in FIGS. 12A and 12B, respectively. The screenshot diagrams 1300 illustrate blending of the first 2D image 710 and the second 2D image 720, with increasing weighting of the second 2D image 720 as the virtual camera moves toward a direct view of the second 2D image 720 on the arc. The result is the impression of smooth rotation about the architectural object.

FIG. 14 a set of screenshot diagrams 1400 illustrating the display of a rotograph 119 of an architectural object, according to another embodiment. As in the rotograph 119 of FIG. 13, the screenshot diagrams 1400 illustrate blending of two or more 2D images 200 as the virtual camera moves along one or more arcs of the virtual camera motion pathway 370. Again, the result is the impression of smooth rotation about the architectural object.

FIG. 15 is a set of screenshot diagrams 1500 illustrating the display of a rotograph 119 of a person, according to one embodiment. As in FIG. 14, the rotograph 119 of FIG. 15 may illustrate the blending of two or more 2D images 200 as the virtual camera moves along one or more arcs of the virtual camera motion pathway 370. The result may be the appearance of rotation about the person, from a frontal view of the person to a side view. The viewer may have the impression of smooth rotation about the person.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A computer-implemented method for generating a 3D interactive presentation illustrating a main object from a rotating viewpoint, the method comprising:
   at a data store, receiving a plurality of two-dimensional images;
   at a processor, identifying the main object within each of the two-dimensional images;
   at the processor, for each of the two-dimensional images, identifying a main axis that passes through the axis of symmetry of the main object;
   at the processor, generating a three-dimensional scene with a virtual camera and an axis of rotation;
   at the processor, positioning each of the two-dimensional images in the three-dimensional scene such that the two-dimensional images are oriented at different orientations about the axis of rotation, and such that the main axis of each of the two-dimensional images is aligned with the axis of rotation;
   at the processor, defining a motion pathway by which the virtual camera is rotatable about the axis of rotation to view the two-dimensional images in sequence;
   at the processor, capturing a plurality of rotograph images, from the virtual camera, during motion of the virtual camera along the motion pathway to generate the 3D interactive presentation; and
   at a display screen, displaying the 3D interactive presentation.

2. The computer-implemented method of claim 1, wherein identifying the main axis of each of the two-dimensional images comprises, for each of the two-dimensional images:
   using the main object to identify a vertical axis of symmetry of the main object; and
   setting the vertical axis of symmetry of the main object as the main axis.

3. The computer-implemented method of claim 1, wherein identifying the main object within each of the two-dimensional images comprises, for each of the two-dimensional images, identifying the main object substantially independently of any user input.

4. The computer-implemented method of claim 1, wherein identifying the main object within each of the two-dimensional images comprises, for each of the two-dimensional images, at an input device, receiving user input designating the main object.

5. The computer-implemented method of claim 1, wherein positioning each of the two-dimensional images in the three-dimensional scene comprises positioning the two-dimensional images such that all adjacent pairs of the two-dimensional images are separated from each other by a common angular displacement magnitude.

6. The computer-implemented method of claim 1, wherein defining the motion pathway comprises defining at least one or more arcs such that each of the arcs is between each adjacent pair of the two-dimensional images such that each end of the arc is in a plane passing through the axis of rotation, perpendicular to one of the two-dimensional images of the adjacent pair.

7. The computer-implemented method of claim 6, further comprising setting a field-of-view of the virtual camera such that, at each end of each of the one or more arcs, an entirety of the field-of-view is occupied by the plurality of two-dimensional images, and the axis of rotation is centered within the field-of-view.

8. The computer-implemented method of claim 6, wherein capturing the plurality of rotograph images, from the virtual camera, during motion of the virtual camera along the motion pathway comprises capturing at least one intermediate rotograph image with the virtual camera intermediate to the ends of one of the arcs.

9. The computer-implemented method of claim 8, wherein capturing at least one intermediate rotograph image comprises blending the two-dimensional images viewable by the virtual camera at the ends of the one of the arcs.

10. The computer-implemented method of claim 1, wherein defining the motion pathway comprises positioning a first end point of the motion pathway at a second end point of the motion pathway such that the 3D interactive presentation comprises a closed 3D interactive presentation.

11. The computer-implemented method of claim 1, wherein defining the motion pathway comprises positioning a first end point of the motion pathway and a second end point of the motion pathway at different locations such that the 3D interactive presentation comprises an open 3D interactive presentation.

12. A non-transitory computer-readable medium for generating a 3D interactive presentation illustrating a main object from a rotating viewpoint, comprising instructions stored thereon, that when executed by a processor, perform the steps of:
 causing a data store to receive a plurality of two-dimensional images;
 identifying the main object within each of the two-dimensional images;
 for each of the two-dimensional images, identifying a main axis that passes through the axis of symmetry of the main object;
 generating a three-dimensional scene with a virtual camera and an axis of rotation;
 positioning each of the two-dimensional images in the three-dimensional scene such that the two-dimensional images are oriented at different orientations about the axis of rotation, and such that the main axis of each of the two-dimensional images is aligned with the axis of rotation;
 defining a motion pathway by which the virtual camera is rotatable about the axis of rotation to view the two-dimensional images in sequence;
 capturing a plurality of rotograph images, from the virtual camera, during motion of the virtual camera along the motion pathway to generate the 3D interactive presentation; and
 causing a display screen to display the 3D interactive presentation.

13. The non-transitory computer-readable medium of claim 12, wherein identifying the main axis of each of the two-dimensional images comprises, for each of the two-dimensional images:
 using the main object to identify a vertical axis of symmetry of the main object; and
 setting the vertical axis of symmetry of the main object as the main axis.

14. The non-transitory computer-readable medium of claim 12, wherein positioning each of the two-dimensional images in the three-dimensional scene comprises positioning the two-dimensional images such that all adjacent pairs of the two-dimensional images are separated from each other by a common angular displacement magnitude.

15. The non-transitory computer-readable medium of claim 12, wherein defining the motion pathway comprises defining at least one or more arcs such that each of the arcs is between each adjacent pair of the two-dimensional images such that each end of the arc is in a plane passing through the axis of rotation, perpendicular to one of the two-dimensional images of the adjacent pair;
 wherein the non-transitory computer-readable medium further comprises instructions stored thereon, that when executed by the processor, set a field-of-view of the virtual camera such that, at each end of each of the one or more arcs, an entirety of the field-of-view is occupied by the plurality of two-dimensional images, and the axis of rotation is centered within the field-of-view.

16. The non-transitory computer-readable medium of claim 12, wherein defining the motion pathway comprises defining at least one or more arcs such that each of the arcs is between each adjacent pair of the two-dimensional images such that each end of the arc is in a plane passing through the axis of rotation, perpendicular to one of the two-dimensional images of the adjacent pair;
 wherein capturing the plurality of rotograph images, from the virtual camera, during motion of the virtual camera along the motion pathway comprises capturing at least one intermediate rotograph image with the virtual camera intermediate to the ends of one of the arcs.

17. The non-transitory computer-readable medium of claim 16, wherein capturing at least one intermediate rotograph image comprises blending the two-dimensional images viewable by the virtual camera at the ends of the one of the arcs.

18. A system for generating a 3D interactive presentation illustrating a main object from a rotating viewpoint, the system comprising:
 a data store configured to receive a plurality of two-dimensional images;
 a processor, communicatively coupled to the data store, configured to:
  identify the main object within each of the two-dimensional images;
  for each of the two-dimensional images, identify a main axis that passes through the axis of symmetry of the main object;
  generate a three-dimensional scene with a virtual camera and an axis of rotation;
  position each of the two-dimensional images in the three-dimensional scene such that the two-dimensional images are oriented at different orientations about the axis of rotation, and such that the main axis of each of the two-dimensional images is aligned with the axis of rotation;

define a motion pathway by which the virtual camera is rotatable about the axis of rotation to view the two-dimensional images in sequence; and capture a plurality of rotograph images, from the virtual camera, during motion of the virtual camera along the motion pathway to generate the 3D interactive presentation; and a display screen, communicatively coupled to the processor, configured to display the 3D interactive presentation.

19. The system of claim 18, wherein the processor is configured to identify the main axis of each of the two-dimensional images by, for each of the two-dimensional images:

using the main object to identify a vertical axis of symmetry of the main object; and setting the vertical axis of symmetry of the main object as the main axis.

20. The system of claim 18, wherein the processor is further configured to position each of the two-dimensional images in the three-dimensional scene by positioning the two-dimensional images such that all adjacent pairs of the two-dimensional images are separated from each other by a common angular displacement magnitude.

21. The system of claim 18, wherein the processor is further configured to define the motion pathway by defining at least one or more arcs such that each of the arcs is between each adjacent pair of the two-dimensional images such that each end of the arc is in a plane passing through the axis of rotation, perpendicular to one of the two-dimensional images of the adjacent pair;

wherein the processor is further configured to set a field-of-view of the virtual camera such that, at each end of each of the one or more arcs, an entirety of the field-of-view is occupied by the plurality of two-dimensional images, and the axis of rotation is centered within the field-of-view.

22. The system of claim 18, wherein the processor is further configured to define the motion pathway by defining at least one or more arcs such that each of the arcs is between each adjacent pair of the two-dimensional images such that each end of the arc is in a plane passing through the axis of rotation, perpendicular to one of the two-dimensional images of the adjacent pair;

wherein the processor is further configured to capture the plurality of rotograph images, from the virtual camera, during motion of the virtual camera along the motion pathway by capturing at least one intermediate rotograph image with the virtual camera intermediate to the ends of one of the arcs.

23. The system of claim 22, wherein the processor is further configured to capture at least one intermediate rotograph image by blending the two-dimensional images viewable by the virtual camera at the ends of the one of the arcs.

* * * * *